US011031891B1

United States Patent
Bassi et al.

(10) Patent No.: US 11,031,891 B1
(45) Date of Patent: Jun. 8, 2021

(54) PREDICTIVE FLUX CONTROL FOR INDUCTION MOTOR DRIVES WITH MODIFIED DISTURBANCE OBSERVER FOR IMPROVED TRANSIENT RESPONSE

(71) Applicant: KING ABDULAZIZ UNIVERSITY, Jeddah (SA)

(72) Inventors: Hussain Bassi, Jeddah (SA); Muhyaddin Jamal Hosin Rawa, Jeddah (SA); M. Abbas Abbasi, Jeddah (SA); Abdul Rashid Husain, Jeddah (SA); Nik Rumzi Nik Idris, Jeddah (SA); Waqas Anjum, Jeddah (SA)

(73) Assignee: KING ABDULAZIZ UNIVERSITY, Jeddah (SA)

( * ) Notice: Subject to any disclaimer, the term of this patent is extended or adjusted under 35 U.S.C. 154(b) by 0 days.

(21) Appl. No.: 17/182,750

(22) Filed: Feb. 23, 2021

(51) Int. Cl.
| | | |
|---|---|---|
| *H02P 21/13* | (2006.01) |
| *H02P 21/00* | (2016.01) |
| *H02P 27/06* | (2006.01) |
| *H02P 21/22* | (2016.01) |
| *H02P 21/20* | (2016.01) |
| *H02P 21/18* | (2016.01) |

(52) U.S. Cl.
CPC .......... *H02P 21/13* (2013.01); *H02P 21/0017* (2013.01); *H02P 21/18* (2016.02); *H02P 21/20* (2016.02); *H02P 21/22* (2016.02); *H02P 27/06* (2013.01)

(58) Field of Classification Search
CPC ................................ H02P 21/13; H02P 21/18
USPC ................. 318/803, 802, 801, 800
See application file for complete search history.

(56) References Cited

U.S. PATENT DOCUMENTS 6,163,121 A * 12/2000 Kumar .................... B61C 15/08
180/197

FOREIGN PATENT DOCUMENTS

| CN | 109302110 A | 2/2019 |
| CN | 108111077 B | 7/2019 |
| CN | 111049449 A | 4/2020 |

OTHER PUBLICATIONS

Wang et al.; "Robust Time Delay Compensation for DTC-Based Induction Machine Systems via Extended State Observers"; Journal of Power Electronics, vol. 18, No. 3, pp. 736-745, May 2018.
Zhang et al.; "Model-Predictive Flux Control of Induction Motor Drives With Switching Instant Optimization"; IEEE Transaction on Energy Conversion, vol. 30, No. 3, Sep. 2015, pp. 1113-1122.

* cited by examiner

*Primary Examiner* — David Luo
(74) *Attorney, Agent, or Firm* — W&C IP

(57) ABSTRACT

A modified reference transformation removes weighting factor from predictive torque control, and a reduced order PI observer based disturbance rejection control (DOBC) is combined to improve transient response. The resulting scheme shows superior performance as compared to previously proposed methods. The superiority of the disclosed MPTC is demonstrated by lower load estimation error and effective current surge suppression at speed jumps while maintaining comparable inner loop performance. Moreover, removal of weighting factor from the cost function gives an additional benefit of optimal balance between flux and torque regulation as evident from simulation and experimental results.

8 Claims, 16 Drawing Sheets

PREDICTIVE FLUX CONTROL FOR INDUCTION MOTOR DRIVES WITH MODIFIED DISTURBANCE OBSERVER FOR IMPROVED TRANSIENT RESPONSE

FIELD OF THE INVENTION

The present invention is generally directed to induction motors and, more specifically, to control systems and methods for induction motors.

BACKGROUND

Model based predictive torque control (MPTC) is an emerging type of MPC for AC motor drives. As compared to traditional control strategies for induction motor drives such as Field-Oriented Control (FOC) and Direct Torque Control (DTC), MPTC offers numerous advantages such as easier implementation, incorporation of multiple objectives in single cost function, optimization based solution, and inclusion of system non-linearities and constraints.

Finite Control Set MPTC (FCS-MPTC) is the most common form of MPTC. It has a simple structure and does not require a switching lookup table like in DTC. FCS-MPTC is an optimization based approach where a cost function, consisting of a weighted sum of torque and flux errors, is defined to determine the optimal switching state of the inverter. In its most common form, the errors in cost function are between the reference values of torque and stator flux magnitude and their future values at the next sampling instant. However, other objectives can also be added into the cost function. The future values are predicted from the mathematical model of induction motor using all the admissible switching states. The switching state which generates minimum value of cost function is chosen and directly applied to the inverter. The inverter translates this state to the corresponding voltage vector (VV) and applies it to the motor terminals. A weighting factor is added to the cost function to maintain the level of regulation between torque and flux due to their differing units of measurement. A higher value of weighting factor puts more emphasis on flux regulation whereas a lower value indicates that torque regulation is being given priority. One of the main issues with FCS-MPTC is the tuning of weighting factor for satisfactory performance. Some solutions to overcome weighting factor design include ranking based multi-objective optimization and online adaptation of weighting factor. However, these solutions either cannot be extended to cost functions with increased number of objectives or suffer from parameter variations.

FCS-MPTC, like other conventional controllers, uses cascaded control structure with inner torque loop and outer speed loop. The outer loop normally employs traditional PI controller for generating torque reference for the inner loop and regulating the motor speed. The inner loop is required to have a relatively faster dynamic response, as compared to outer loop, to follow the reference torque and ensure closed loop stability. In real time implementations, simple saturation blocks are used to limit the reference torque to ensure safety limits on motor currents. However, the use of saturation blocks may result in larger current overshoots and longer settling times. Moreover, cascaded structure using PI controller may require retuning of controller gains under different operating conditions due to bandwidth and time constant mismatches. Other disadvantages include higher steady state error under model uncertainties and external disturbances. To overcome the limitations of cascade control in MPTC, cascade-free MPTC schemes have been introduced. However, the cost function formulation and weighting factor design for these methods becomes challenging and optimization of multiple objectives with different time constants increases the computational complexity.

In spite of its good steady state performance, a PI controller exhibits loss of nominal performance under transient period in the presence of parameter variations and external disturbances. To improve the robustness of speed controller against such model uncertainties and disturbances, disturbance observer based control (DOBC) can be used to replace conventional PI control. A DOBC observer has been designed for FCS-MPTC under parameter variations and load disturbances. External load changes and model uncertainties are lumped together in a single disturbance and speed equation is used to obtain the desired estimator. A similar approach has been adapted for FCS model based predictive current control (FCS-MPCC). Other methods for recovering nominal performance of the outer speed loop include integral sliding mode control (I-SMC), PID control, and feedback linearization. However, these methods suffer from various problems such as chattering in I-SMC, difficulty in practical implementation of D part in PID and complexity of the techniques as compared to the simple PI solutions for disturbance rejections such as reduced order PI observer. A DOBC-MPTC approach exists which assumes load torque as an unknown disturbance. A reduced order PI observer (ROPIO) also exists. Although ROPIO is designed for disturbance rejection, it is also inherently robust to parameter variations, explicitly limiting the disturbances to load torque changes only. However, in all these DOBC-MPTC formulations, it is assumed that reference speed is differentiable at all times, hence ignoring the sudden speed jumps where derivative term becomes infinite. The differentiability condition restricts the reference speed to vary slowly to avoid large overshoots in stator currents. One way to avoid this restriction on reference speed and eliminate derivatives from the DOBC design is to redefine speed equation in new variables without derivatives. However, the resulting DOBC is not convenient for real time implementations.

SUMMARY

An aspect of exemplary embodiments is a modified MPTC without weighting factor and ROPIO based DOBC considering the reference speed jumps. This not only offers improvement in the outer speed loop but also to the inner torque loop. In this work, a modified reference transformation—convenient for realtime implementation—is used to formulate predictive flux control (PFC) for the inner loop. Similarly for outer loop, a ROPIO-DOBC is employed for improving the performance of speed control especially for speed reference jumps. The resulting FCS-MPFC is compared to a ROPIO-DOBC scheme without speed jumps. The superiority of the exemplary scheme, in terms of disturbance rejection capability, load estimation at speed jumps, and suppression of the resulted higher currents, is illustrated by experimental results obtained on an induction motor drive using two-level three-phase inverter and dSpace DS1104 controller board.

A novelty of this work lies in both loops of the cascaded FCS-MPTC of induction motors. For the inner torque loop the use of weighting-factor-free formulation of MPTC using modified reference transformation gets rid of weighting factor. This modified reference transformation merges two different angular calculations into a single computation by employing simple trigonometric identities and the Lagrange approximation. For the outer speed loop augmentation of the controller with modified ROPIO (M-ROPIO) contributes to the improvement of transient response at reference speed jumps. The speed jumps are part of the inherent design of the observer and a low-pass filter is used to avoid DC drift and other problems associated with practical implementation of pure integrator. The resulting MPFC scheme is weighting-factor free and works satisfactorily under sudden speed jumps and does not generate stator current surges.

DETAILED DESCRIPTION

Figure 1A:
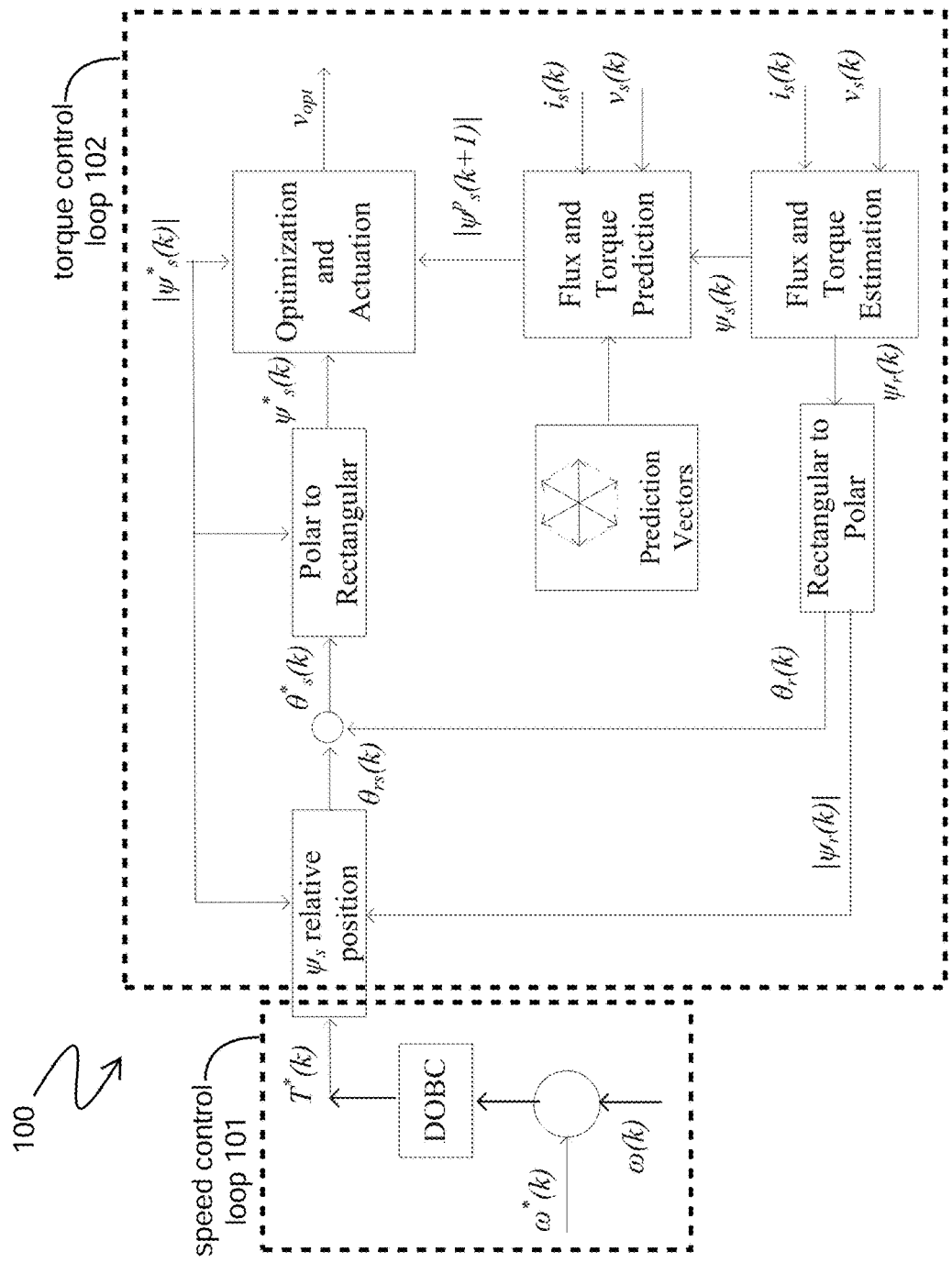
FIG. 1A is a block diagram of Predictive Flux Control (PFC) with Disturbance Observer based (DOB) Speed Controller.

FIG. 1A is a block diagram of an exemplary control system 100. The control system comprises or consists of two control loops as shown in the figure. These are the outer speed control loop 101 and the inner torque control loop 102. The outer speed control loop 101 generates reference torque T* for the inner torque control loop 102.

The outer speed control loop 101 contains disturbance observer-based controller (DOBC) which also comprises modified reduced order proportional integral observer (M-ROPIO) inside configured to minimize load torque estimation error with a low-pass filter (LPF) with a cutoff frequency. The reference torque T* is limited by a rated torque of the induction motor. The M-ROPIO limits the effects of speed jumps, e.g., by maintaining a substantially steady state value of current irrespective of speed jumps. "Substantially" means within industry accepted tolerances.

The inner torque control loop 102 comprises a weighting-factor-free formulation of model based predictive torque control (MPTC) using modified reference transformation to determine reference flux angle $\theta^*_s$ from the reference torque T* generated by the outer speed control loop 101. Ultimately, the role of the control system 100 is to output an optimal voltage or switching state for the induction motor, where the voltage or switching state is selected using the reference flux angle $\theta^*_s$.

Figure 1B:
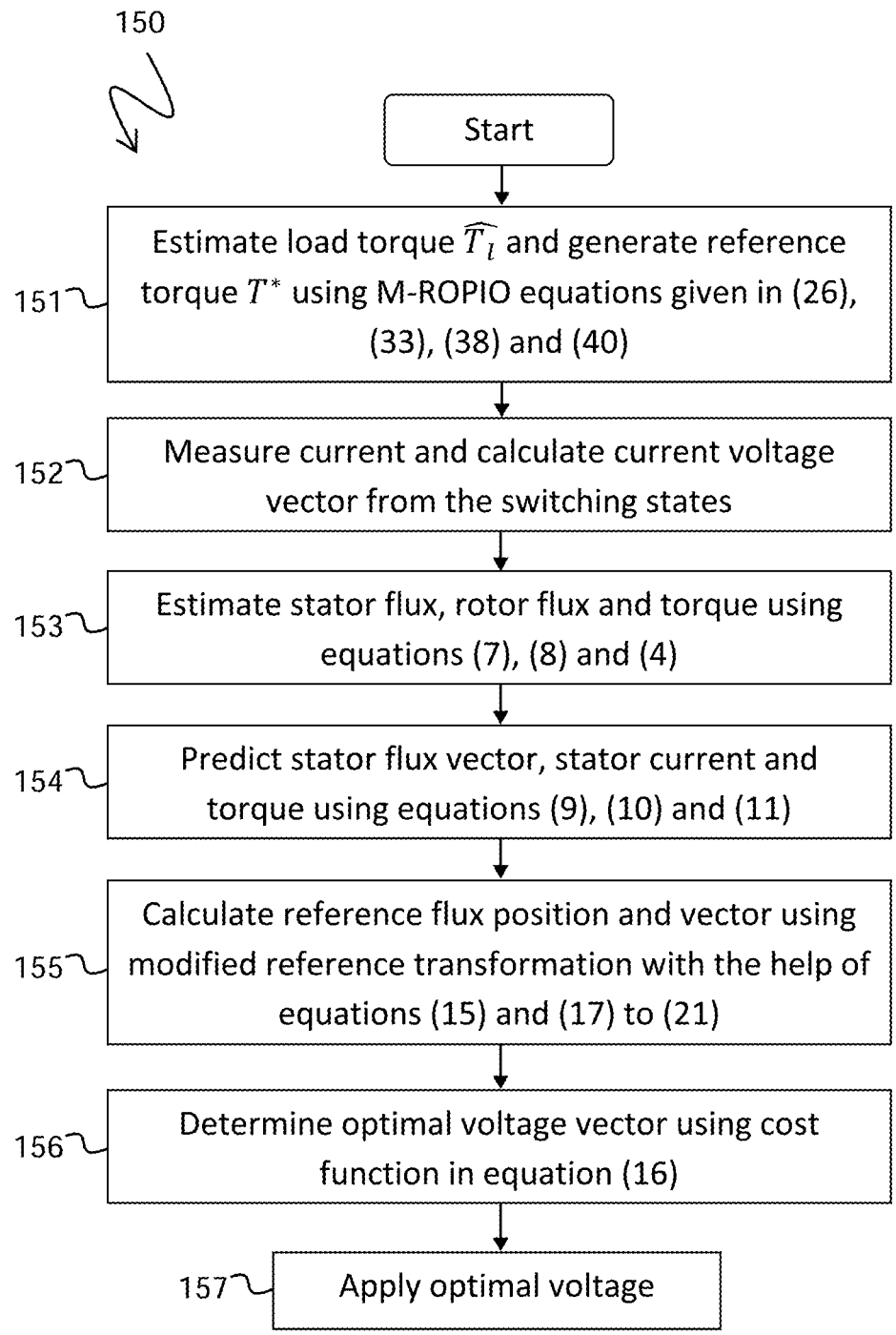
FIG. 1B is a flow chart showing implementation of Predictive Flux Control (PFC) with Disturbance Observer based (DOB) Speed Controller.
Figure 1C:
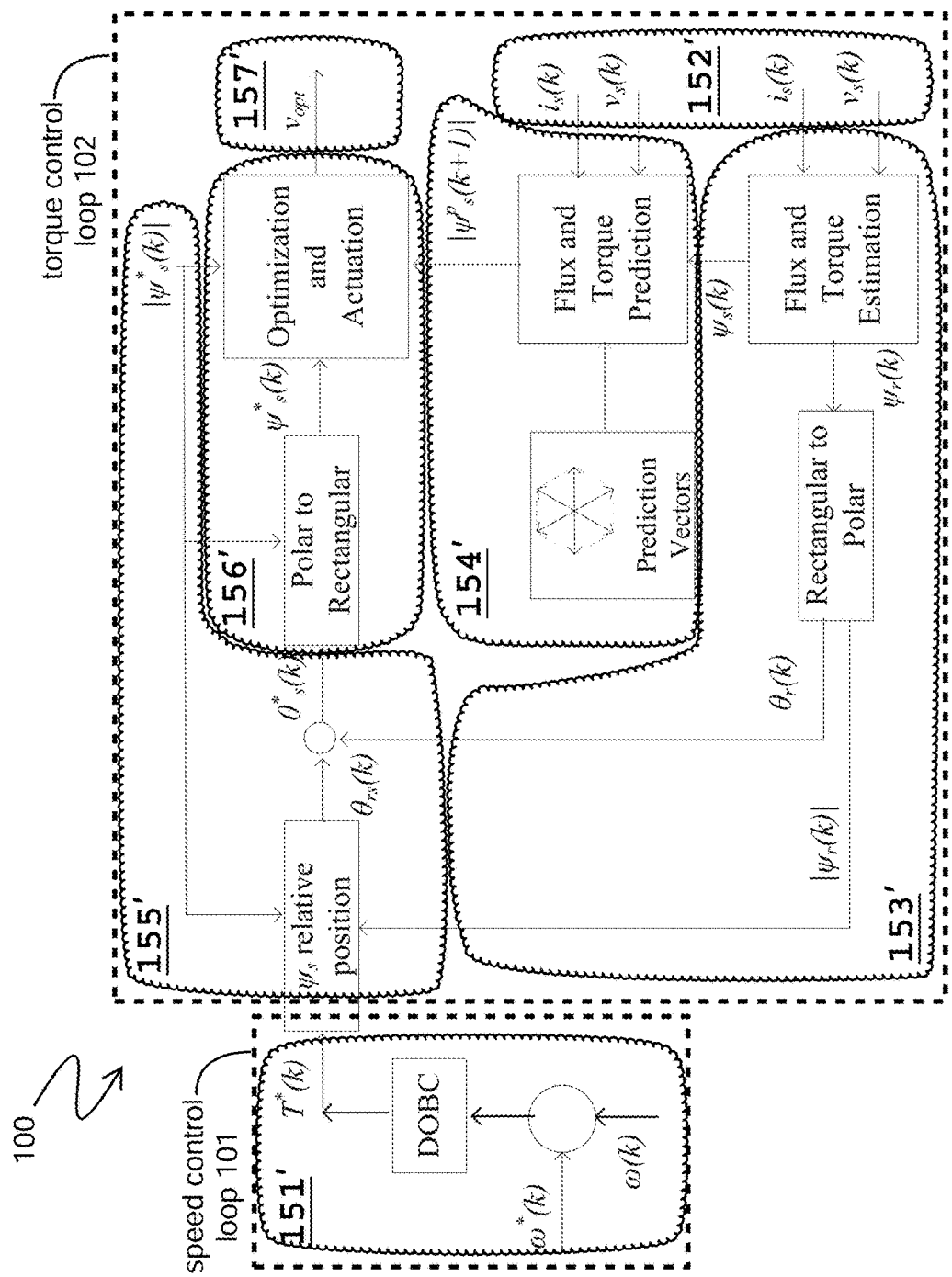
FIG. 1C is a modification of the block diagram of FIG. 1A highlighting the relationship between FIGS. 1A and 1B.

FIG. 1B shows a method 150 for the implementation of the proposed control system 100. Reference is made to equations explained in greater detail below. FIG. 1C highlights the relationship between the block diagram of FIG. 1A and the flowchart of FIG. 1B. The method 150 is, for the purpose of exemplary illustration, broken into seven steps labeled 151 to 157. Portions of the block diagram of FIG. 1A corresponding with the seven steps 151 to 157 are enclosed in bubbles in FIG. 1C and labeled 151' to 157' respectively.

According to the exemplary method 150, block 151 comprises estimating load torque $\hat{T}_l$ and generate reference torque T* using M-ROPIO equations given in (26), (33), (38) and (40) below. Block 152 comprises measuring current and calculating current voltage vector from the switching states. Block 153 comprises estimating stator flux, rotor flux and torque using equations (7), (8) and (4). Block 154 comprises predicting stator flux vector, stator current and torque using equations (9), (10) and (11). Block 155 comprises calculating reference flux position and vector using modified reference transformation with the help of equations (15) and (17) to (21). Block 156 comprises determining optimal voltage vector using cost function in equation (16). Block 157 comprises applying optimal voltage vector.

The equations referenced in FIG. 1B will now be explained in detail. The state space model of induction motor in stationary reference frame can be described by the following mathematical relations:

$$v_s = R_s i_s + \frac{d\psi_s}{dt} \qquad (1)$$

$$0 = R_r i_r - j\omega \psi_r + \frac{d\psi_r}{dt} \quad (2)$$

$$\psi_s = L_s i_s + L_m i_r \quad (3)$$

$$\psi_r = L_r i_r + L_m i_s \quad (4)$$

$$T = 1.5 p \Im m\{\overline{\psi_s} i_s\} = -1.5 p \Im m\{\overline{\psi_r} i_r\} \quad (5)$$

$$J\frac{d\omega_m}{dt} = T_e - T_l \quad (6)$$

where $i_s$, $v_s$ and $\psi_s$ are stator current, voltage and flux vectors; $i_r$ and $\psi_r$ are rotor current and flux vectors; T and $T_l$ are electromagnetic and load torques; $\omega_m$ and $\omega$ are mechanical and electrical rotor speeds; $R_s$ and $R_r$ are stator and rotor resistances; $L_s$, $L_r$, and $L_m$ are stator, rotor, and mutual inductance; J is moment of inertia; p is number of pole pairs; $\overline{\psi_r}$ and $\overline{\psi_s}$ are complex conjugates of rotor and stator flux vectors and $\Im m$ represents the imaginary part of the complex vector.

Model Based Predictive Torque Control (MPTC)

The conventional model based predictive torque control (MPTC) consists of three stages: (i) estimation of torque T and flux $\psi_s$ using an observer (ii) prediction of flux, current and torque for next time interval i.e. $\psi_s^P(k+1)$, $i_s^P(k+1)$, and $T^P(k+1)$ (iii) selection of optimal voltage vector (VV) from admissible VVs i.e. VV={$V_0, V_1, \ldots V_7$}. In this disclosure, an LPF (Voltage Model) based estimator is used for flux and torque which can be described by following equations:

$$\hat{\psi}_s(k) = a \cdot \{\hat{\psi}_s(k-1) + T_s(v_s(k) - R_s i_s(k))\} \quad (7)$$

$$\hat{T}(k) = \frac{3}{2} p \Im m\{\overline{\psi}_s(k) i_s(k)\} \quad (8)$$

where $$a = \frac{1}{1 + T_s \omega_c},$$

$T_s$ is sampling time and sampling instants are marked as k−1 for previous instant, k for current instant and k+1 for next sampling instant respectively. The accuracy of flux and torque estimation is affected by the operating speed of the drive. At low speeds, the VM performs poorly and estimations are not accurate. However, model mismatching and low speed operation are not the focus of this technology. Under medium and higher speeds, VM gives relatively accurate estimations of flux and torque. Based on the state-space model of IM, the predictions can be made using the following relations:

$$\psi_s^P(k+1) = \hat{\psi}_s(k) + T_s(v_s(k) - R_s i_s(k)) \quad (9)$$

$$T^P(k+1) = \frac{3}{2} p \Im m\{\overline{\psi}_s^P(k+1) i_s^P(k+1)\} \quad (10)$$

$$i_s^P(k+1) = \left(1 + \frac{T_s}{\tau_\sigma}\right) i_s(k) + \frac{T_s}{R_\sigma(T_s + \tau_\sigma)}\left\{\left(\frac{k_r}{\tau_r} - jk_r\omega\right)\hat{\psi}_r(k) + v_s(k)\right\} \quad (11)$$

The cost function for the selection of optimal VV is written as:

$$g = |T^*(k+1) - T^P(k+1)| + \lambda ||\psi^*_s(k+1)| - |\psi_s^P(k+1)|| \quad (12)$$

where superscript * denotes the reference values and $\lambda$ is weighting factor. However, the major drawbacks of this class of MPTC are:

Higher computational effort is required for the selection of optimal VV. If additional objectives are included to the cost function or a higher level converter topology is used, computational burden increases exponentially.

Weighting factor tuning is a challenging task to achieve satisfactory performance.

Model Based Predictive Flux Control (MPFC)

To remove the weighting factor from MPTC, one solution is based on the reference transformation which translates torque reference into an equivalent flux reference. The resulting cost function only consists of flux errors effectively removing weighting factor and the resulting method is called model based predictive flux control (MPFC). The electromagnetic torque equation can be expressed as:

$$\hat{T} = \frac{3}{2} p\eta L_m |(\psi_r \times \hat{\psi}_s)| = \frac{3}{2} p\eta L_m |\psi_r||\hat{\psi}_s|\sin\hat{\theta}_{rs} \quad (13)$$

where $$\eta = \frac{1}{L_s L_r - L_m^2}$$

is a constant, $\hat{\theta}_{rs}$ is the angle between rotor flux vector $\psi_r$ and estimated stator flux vector $\hat{\psi}_s$, p is the number of pole pairs of induction motor, and $L_m$ is mutual inductance of the induction motor. In polar form, the flux vectors can be expressed as $\psi_r = |\psi_r|\angle\theta_r$ and $\hat{\psi}_s = |\hat{\psi}_s|\angle\hat{\theta}_s$ whereas $\hat{\theta}_{rs} = \hat{\theta}_s - \theta_r$. If the rotor flux is known, then Equation (13) at reference values can be written as:

$$T^* = \frac{3}{2} p\eta L_m |(\psi_r \times \psi_s^*)| = \frac{3}{2} p\eta L_m |\psi_r||\psi_s^*|\sin\theta_{rs}^* \quad (14)$$

where $\psi^*_s = |\psi^*_s|\angle\theta^*_s$ is the reference stator flux vector and $\theta^*_{rs} = \theta^*_s - \theta_r$ which can be calculated as:

$$\theta^*_{rs} = \arcsin\left(\frac{T^*}{\frac{3}{2} p\eta L_m |\psi_r||\psi^*_s|}\right) \quad (15)$$

Once the angle $\theta^*_{rs}$ is determined from Equation (15), the reference stator flux angle can be computed as $\theta^*_s = \theta^*_{rs} + \theta_r$ which effectively translate reference torque T* into equivalent reference flux vector $\psi^*_s$. This is known as "reference transformation (RT)" and the resulting cost function can be written as:

$$g = |\psi^*_s(k+1) - \psi_s^P(k+1)| \quad (16)$$

Although reference transformation removes weighting factor from the MPTC formulation, it however requires additional computations for flux positions i.e. $\theta_r$ and $\theta^*_{rs}$. Moreover, to implement two different trigonometric functions in hardware to determine these positions at each sampling instant will require additional hardware resources and add to the cost of the controller. To overcome these challenges, a modified reference transformation (M-RT) is proposed as follows.

The reference flux angle $\theta^*_s$ can be expressed as:

$$\theta^*_S = \arctan\left(\frac{\psi_{r\beta}}{\psi_{r\alpha}}\right) + \arcsin\left(\frac{T^*}{\frac{3}{2}p\eta L_m|\psi_r||\psi^*_s|}\right) \quad (17)$$

$$\theta^*_s = \arctan\left(\frac{\psi_{r\beta}}{\psi_{r\alpha}}\right) + \arctan\left(\frac{T^*}{\sqrt{\left(\frac{3}{2}p\eta L_m|\psi_r||\psi^*_s|\right)^2 - (T^*)^2}}\right) \quad (18)$$

$$\theta^*_s = \arctan(u) + \arctan(v) \quad (19)$$

$$\theta^*_s = \arctan\left(\frac{u+v}{1-uv}\right) \quad (20)$$

$\alpha$ and $\beta$ are the real and imaginary parts of the complex vector quantities such as rotor flux vector. The expression in Equation (20) is a direct way to compute reference flux position avoiding two different angle calculations. To further simplify the computation of arctan function the following 3-point Lagrange approximation is used:

$$\arctan(y) \approx \frac{\pi}{4}y + 0.273y(1 - |y|), \quad -1 \le y \le 1 \quad (21)$$

The complete block diagram of MPFC based on modified reference transformation along with disturbance observer based (DOB) speed controller is shown in FIG. 1.

Speed Control with Disturbance Rejection

Most of the direct torque control (DTC) techniques use cascaded control structure where outer speed loop mainly serves to generate reference torque T* for the inner loop. Ignoring frictional losses of the motor, the dynamic equation for speed loop can be written as Equation (6). Using the same equation, reference torque T* for MPFC can be written as:

$$T^*(t) = J\frac{d\omega_m(t)}{dt} + T_l(t) \quad (22)$$

where load torque $T_l$ is considered an unknown disturbance and estimated using an observer. The PI based reduced order observer is used in this exemplary embodiment due to its simplest configuration and capability to cope with external disturbance as well as parameter variations. Other suitable observers for other embodiments include but are not limited to adaptive observer, sliding mode observers, and extended state observers. However most of these methods require more complex design and demand higher computational time compared to a PI based reduced order observer. A simple predictive algorithm with prediction horizon $T_p$ for speed tracking which allows the speed error $e_\omega$ to reach zero in a single prediction step can be expressed as:

$$\omega^*(t + T_p) - \omega_m(t + T_p) = 0 \quad (23)$$

where $\omega^*$ is the reference speed. Using the Taylor expansion, equation (IV) can be expressed as:

$$\omega^*(t) + T_p\frac{d\omega^*(t)}{dt} - \omega_m(t) - T_p\frac{d\omega_m(t)}{dt} = 0 \quad (24)$$

and from Equation (24), the derivative term of speed can be written as:

$$\frac{d\omega_m(t)}{dt} = \frac{d\omega^*(t)}{dt} + \frac{1}{T_p}(\omega^*(t) - \omega_m(t)) \quad (25)$$

Substituting Equation (25) into Equation (22), the reference torque can be calculated as:

$$T^*(t) = \frac{J}{T_p}(\omega^*(t) - \omega_m(t)) + J\frac{d\omega^*(t)}{dt} + T_l(t) \quad (26)$$

This equation is also used for estimating load torque $\hat{T}_l$ as shown in the follow subsection discussing ROPIO.

Reduced Order PI Observer (ROPIO) for Load Torque

Figure 2A:
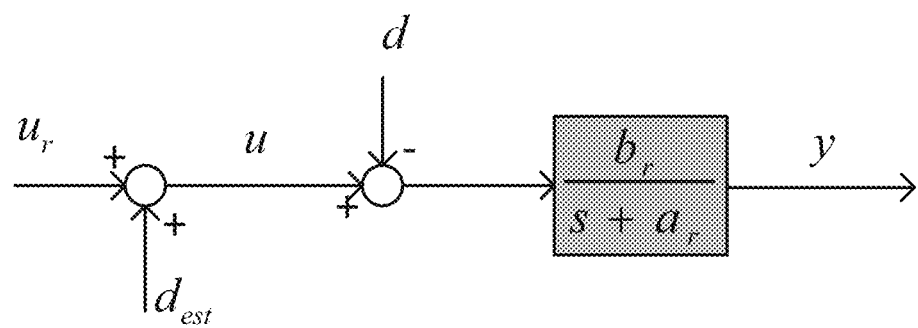
FIG. 2A is Disturbance observer based (DOB) speed control system, Nominal System.

If the bandwidth of speed loop is sufficiently smaller than the bandwidth of the inner torque loop, then speed loop can be approximated with a first order system shown in FIG. 2A. The symbols used in the figure for IM drive application can be linked as: $d=T_l$ represents an unknown external disturbance, $u_r=T_e$ is the electromagnetic torque generated by the motor, $u=u_r+d_{est}$, $d_{est}=\hat{T}_l$ is the estimate of load torque, $$b_r = \frac{1}{J}, a_r = \frac{B}{J},$$

and $y=\omega_m$. The objective of this strategy is to design $d_{est}$ in such a way that the output y from the system shown in FIG. 2(a) is equal to the output y of the system shown in FIG. 2(b). In this way, the estimate $d_{est}$ should be as close as possible to d to cancel its effect. The system can be described by the following relation:

$$\dot{\omega}_m = -\frac{B}{J}\omega_m + \frac{1}{J}(T_e - T_l) \quad (27)$$

Figure 2B:
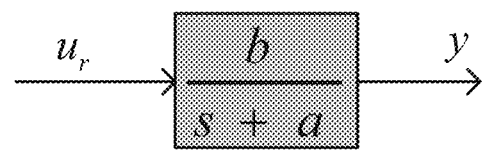
FIG. 2B is Disturbance observer based (DOB) speed control system, Equivalent System.

Assuming that the system in FIG. 2A and in FIG. 2B produce exactly the same output and load torque is constant i.e.

$$\frac{dT_l}{dt} = 0,$$

the state space model of the system can be represented as:

$$\begin{bmatrix} \dot{\omega}_m \\ \dot{T}_l \end{bmatrix} = \begin{bmatrix} -\frac{B}{J} & -\frac{1}{J} \\ 0 & 0 \end{bmatrix} \begin{bmatrix} \omega_m \\ T_l \end{bmatrix} + \begin{bmatrix} \frac{1}{J} \\ 0 \end{bmatrix} T_e \quad (28)$$

Considering load torque $T_l$ as an unknown disturbance, the reduced order observer for Equation (6) can be defined as:

$$\frac{d\hat{T}_l}{dt} = l(T_l - \hat{T}_l) \quad (29)$$

where $\hat{T}_l$ is estimated load torque and l is observer gain. Combing Equations (22) and (29), the corresponding ROPIO can be written as:

$$\frac{d\hat{T}_l}{dt} = \frac{l}{J}\hat{T}_l(t) + l\left(\frac{d\omega_m(t)}{dt} - \frac{1}{J}T^*(t)\right) \quad (30)$$

Using the estimated load torque $\hat{T}_l$ in Equation (26) and substituting the resulting equation back into Equation (30):

$$\frac{d\hat{T}_l}{dt} = l\frac{d}{dt}(\omega^*(t) - \omega_m(t)) - \frac{l}{T_p}(\omega^*(t) - \omega_m(t)) \quad (31)$$

The load torque expression in Equation (31) can be integrated to obtain the estimation of the unknown disturbance as, $$\hat{T}_l = le_\omega(t) - \frac{l}{T_p}\int e_\omega(t)dt \quad (32)$$

where $e_\omega(t) = \omega^*(t) - \omega_m(t)$ is speed error at time instant t. It is clear from Equation (32) that the observer behaves like a PI speed controller with disturbance rejection capability. From Equation (26), however, it is evident that at reference speed jumps, the derivative term may cause high stator current surges to provide very large reference torque T* and incorrect load estimates.

Modified Reduced Order PI Observer (M-ROPIO) for Load Torque

To minimize the effects of speed jumps, a modified load torque observer which is suitable for real time implementation is used in exemplary embodiments to remove the drawbacks of ROPIO and improve the accuracy of load estimation. The reference torque T* generated by the speed loop may violate the bounds of the torque which the motor can actually produce. Therefore, T* is confined within the limits of rated torque of the motor $T_{nom}$ to generate the effective reference torque given as:

$$T^*_{eff}(t) = \begin{cases} T_{nom}, & T^*(t) \geq T_{nom} \\ T^*(t), & -T_{nom} < T^*(t) < T_{nom} \\ -T_{nom}, & T^*(t) \leq -T_{nom} \end{cases} \quad (33)$$

If the speed jumps occur at time instants $t_1, t_2, \ldots t_n$ and speed at starting time is defined as $\omega^*(0)$, then the reference speed for $t > t_i$ for $i=1, 2, \ldots n$ can be written as:

$$\omega^*(t) = \omega^*(0) + \sum_{\tau=t_1}^{t_i}\Delta\omega^*(\tau) \quad (34)$$

where $\Delta\omega^*(t_i) = \omega^*(t_i) - \omega^*(t_i - T_{sw})$ are reference speed jumps and $T_{sw}$ is the sampling time of speed controller. Replacing the reference torque T* in (30) with (33) and ignoring $$\frac{d\omega^*(t)}{dt},$$

the estimated load torque can be written as:

$$\frac{d\hat{T}_l}{dt} = l\frac{d\omega_m(t)}{dt} - \frac{l}{T_p}(\omega^*(t) - \omega_m(t)) + \frac{l}{J}(T^*(t) - T^*_{eff}(t)) \quad (35)$$

Let $$T(t) = \frac{l}{J}\int_0^t(T^*(t) - T^*_{eff}(t))d\tau \quad (36)$$

Equation (36) in s domain can be written as:

$$T(s) = \frac{l}{J}\frac{(T^*(s) - T^*_{eff}(s))}{s} \quad (37)$$

To avoid the pure integration problems such as DC offset and drift in practical implementation of Equation (37), an LPF with cutoff frequency $\omega_c$ can be used. The modified equation can be expressed as:

$$T_{mod}(s) = \frac{l}{J}\frac{(T^*(s) - T^*_{eff}(s))}{s + \omega_c} \quad (38)$$

which can be approximated by the following discrete-time relation:

$$T_{mod}(k) = \frac{1}{1 + \omega_c T_{s\omega}}T_{mod}(k-1) + \frac{lT_{s\omega}}{J(1 + \omega_c T_{s\omega})}(T^*(k) - T^*_{eff}(k)) \quad (39)$$

The approximation in above equation can be used to express the load estimation with speed jumps as:

$$\hat{T}_l(t) = -\frac{l}{T_p}\int_0^t e_\omega(t)d\tau - le_\omega(t) + T_{mod}(t) + S(t) \quad (40)$$

where $$S(t) = le_\omega(0) + l\sum_{\tau=t_1}^{t_i}\Delta\omega^*(\tau) \quad (41)$$

With these relations, a better load torque estimation is obtained especially at speed jumps which is not possible through basic ROPIO. If the load estimation is correct, it will lead to correct reference torque generation and avoid the current surges at sudden reference speed jumps as shown next in the experimental results of the Examples.

EXAMPLES

Example 1. Simulation Results

In this section, selected simulation results are presented to validate the performance of M-ROPIO used with MPFC.

Figure 3:
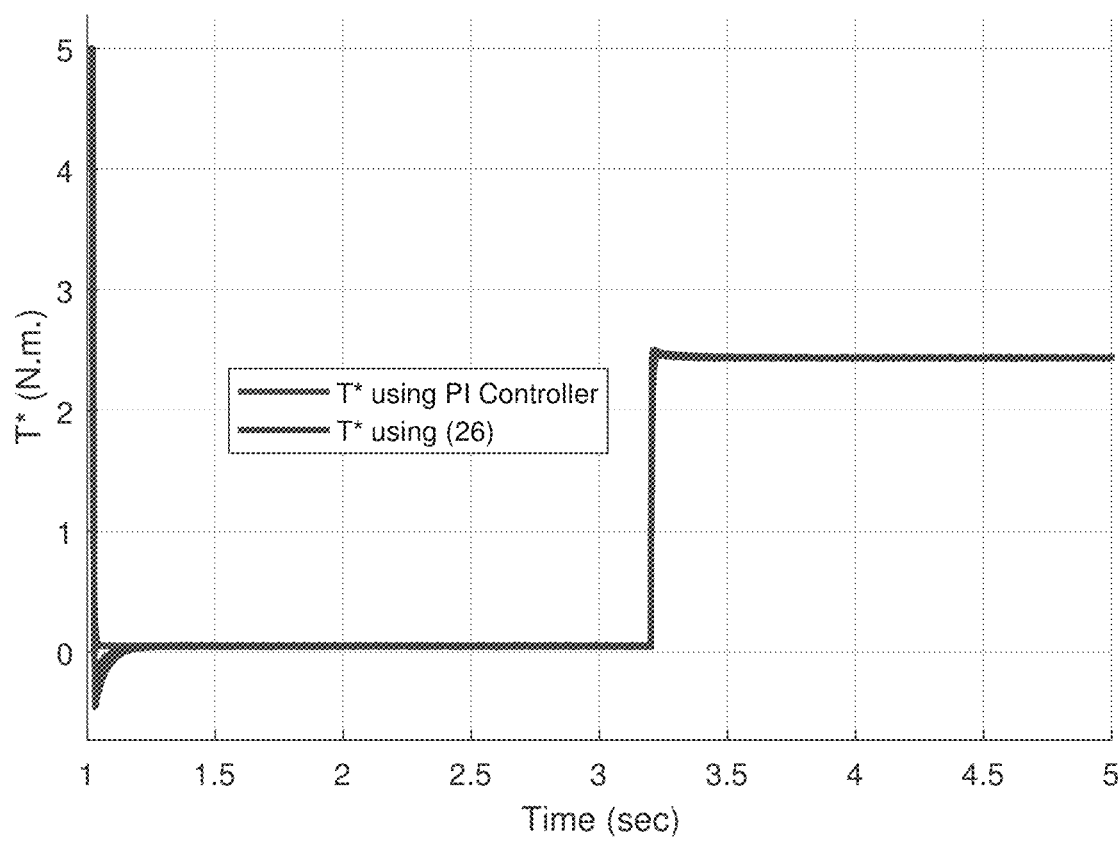
FIG. 3 is comparison of reference torque (T*) generation using PI controller and Equation (26).

The simulations were carried out in Matlab/Simulink environment with a sampling time of 40 µs. The three-phase induction motor drive model is used with the same parameters used for experimental results (Example 2). The inverter, motor, and observer models were built using discrete Simulink components whereas MPFC is implemented in a Matlab function block. The controller and motor parameters are given in Table 1 in next section. To demonstrate the accuracy of Equation (26) for reference torque (T*) generation, simulations were carried out to compare the torque generated by Equation (26) to the torque produced by standard reference torque generation method of PI controller. A step reference torque command is given to both PI controller and observer based on Equation (26) and the generated T* are shown in FIG. 3. The torque command is kept 0 N.m. for t<2:2 s and is stepped up to 4.7 N.m. at t=2:2 s. It is evident from the figure that both the methods follow the torque command with Equation (26) almost exactly copying the behavior of PI controller. Except for small deviations at start-up, it can safely be assumed that Equation (26) is almost identical in performance to PI method of reference torque generation with a comparable accuracy.

Figure 4A:
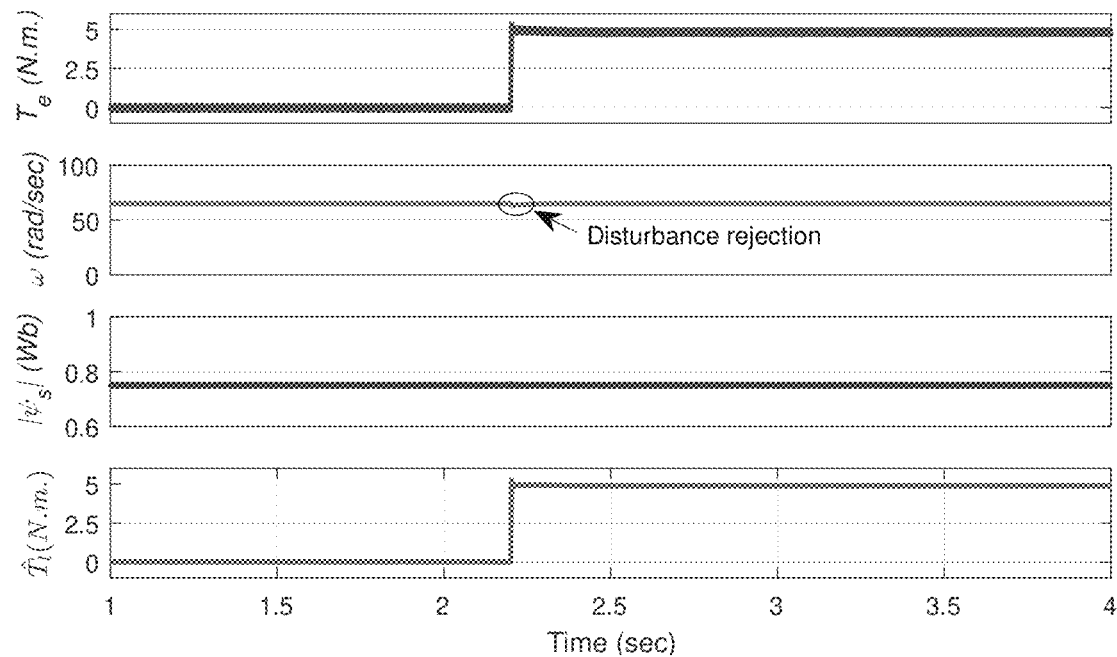
FIG. 4A is simulation results for disturbance rejection capability of two observers used with MPFC for a step change in load torque, ROPIO.
Figure 4B:
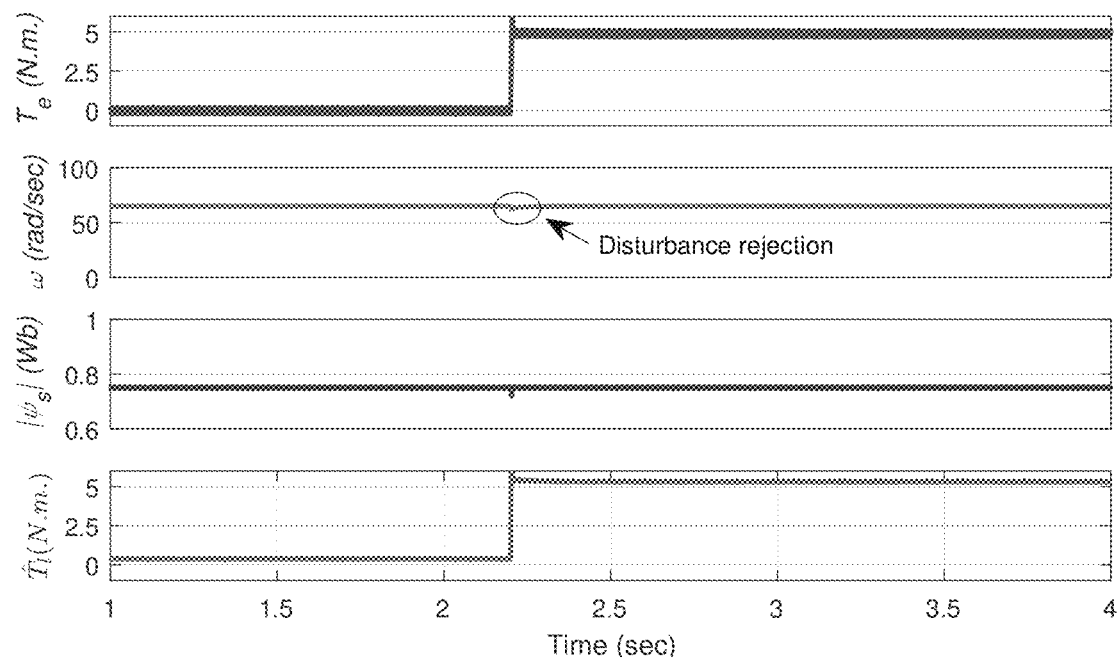
FIG. 4B is simulation results for disturbance rejection capability of two observers used with MPFC for a step change in load torque, M-ROPIO.

The disturbance rejection capabilities of ROPIO and M-ROPIO are demonstrated in FIGS. 4A and 4B respectively where motor torque $T_e$, speed ω, stator flux magnitude $\|\psi_s\|$ and estimated load torque $T_l$ are shown from top to bottom for each observer. A load of 9.4 N.m is applied at t=2:2 s while maintaining the rated speed of 65 rad/s. It is clear from the figure that both the observers are able to reject the load disturbance and maintain the motor speed at the reference level. Whereas, these observers also provide the reasonable estimates of the load torque. A small decrease of 5 rad=s in motor speed is observed in both ROPIO and M-ROPIO at the application of disturbance which is quickly rejected by the observers. From these simulation results, it can be assumed that both ROPIO and M-ROPIO show similar disturbance rejection performance.

Figure 5A:
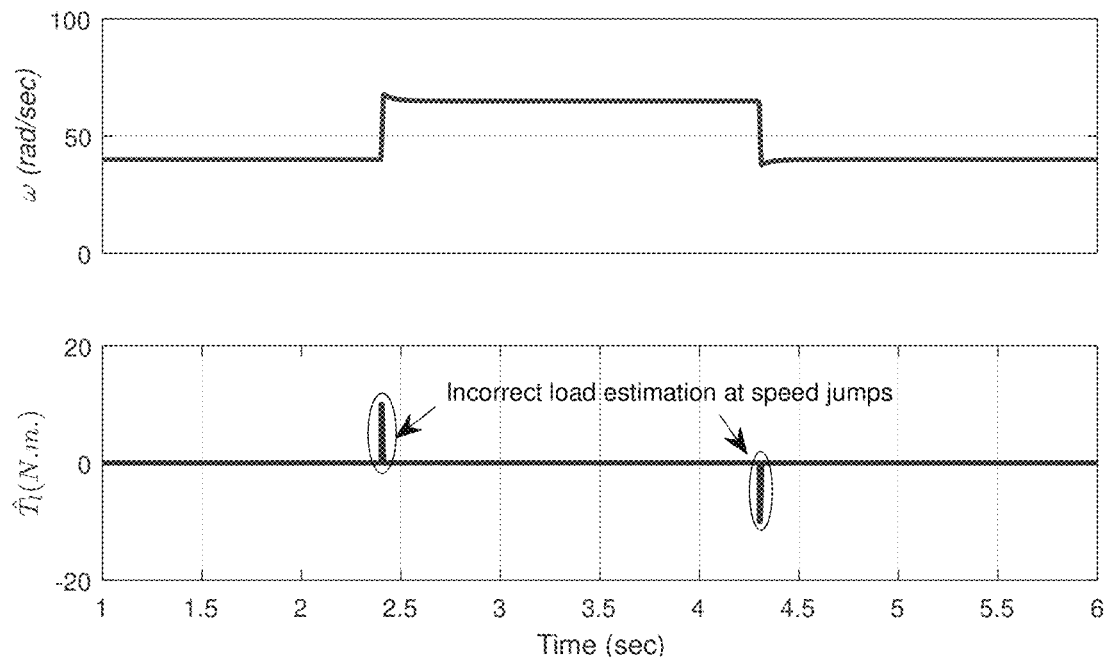
FIG. 5A is simulation results for transient response of two observers used with MPFC for reference speed jumps, ROPIO.
Figure 5B:
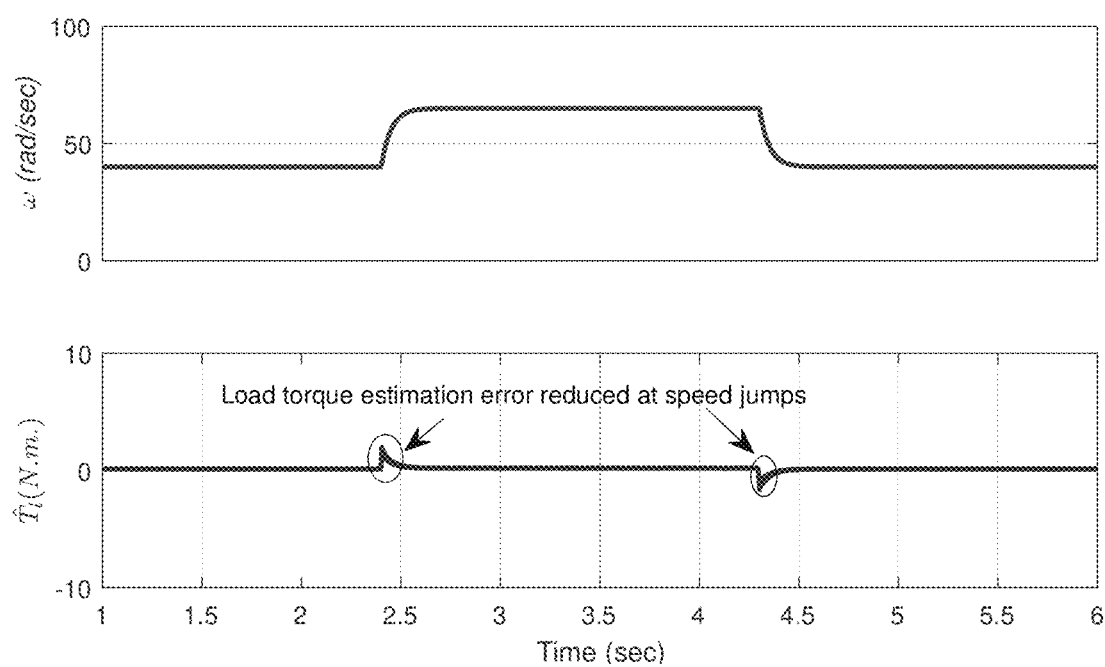
FIG. 5B is simulation results for transient response of two observers used with MPFC for reference speed jumps, M-ROPIO.
Figure 6A:
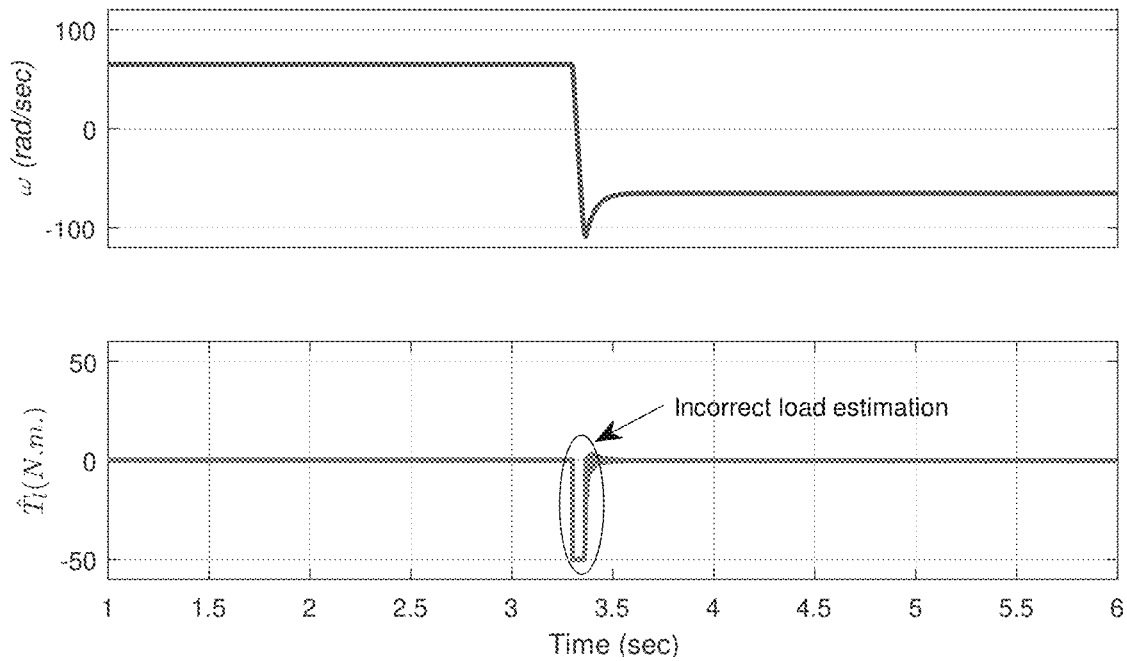
FIG. 6A is simulation results for transient response of two observers used with MPFC under speed reversal condition, ROPIO.
Figure 6B:
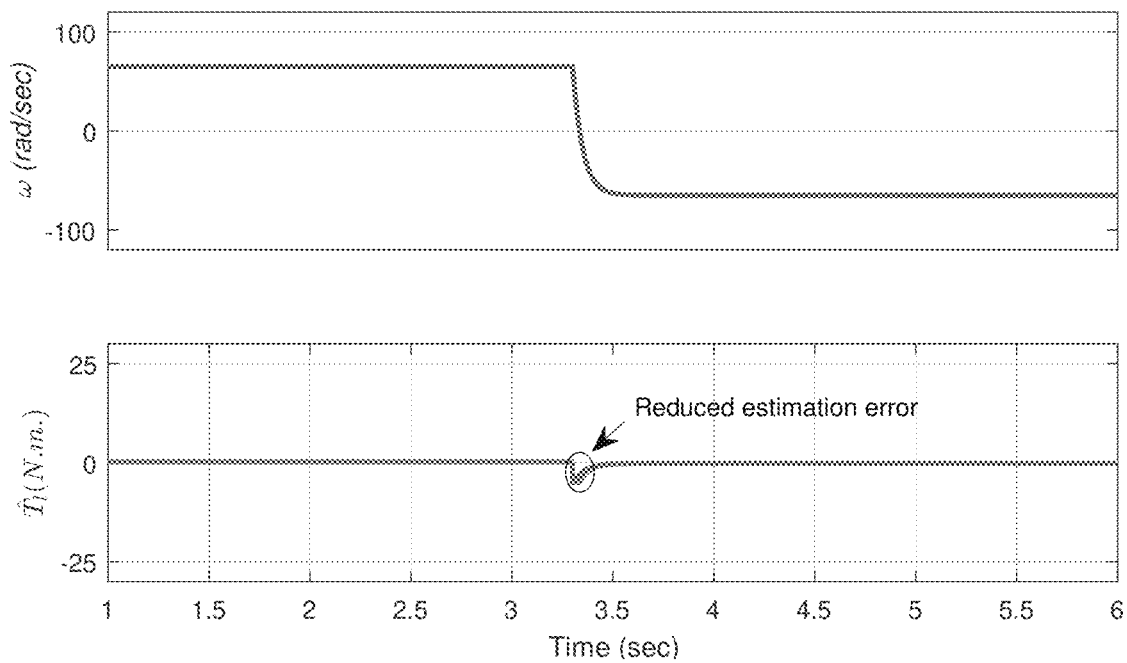
FIG. 6B is simulation results for transient response of two observers used with MPFC under speed reversal condition, M-ROPIO.

Although ROPIO and M-ROPIO show similar disturbance rejection and estimation performance for smooth reference speed, however, the advantage of M-ROPIO over ROPIO can be emphasized from reference speed jump tests. For this purpose, two speed tests without any external disturbance are conducted in simulations and the results for ROPIO and M-ROPIO are shown in FIGS. 5A, 5B and 6A, 6B respectively. In FIGS. 5A and 5B reference speed ω* is increased from 40 rad/s to 65 rad/s at t=2.4 s and back to 40 rad/s at t=4:3 s. The rotor speed w and load torque $T_l$ estimation are shown for ROPIO in FIG. 5A and for M-ROPIO in FIG. 5B. It is clear from FIG. 5A that ROPIO provides incorrect disturbance estimates. The reason for these results is that speed jumps are not considered in ROPIO design which lead to loss of nominal performance momentarily. M-ROPIO, on the other hand, generates load estimates up to 80% reduction in estimate error as compared to ROPIO. The error in estimates is even greater for bigger speed jumps such as speed reversal case. In FIGS. 6A and 6B, the disturbance estimation is shown for both ROPIO (FIG. 6A) and M-ROPIO (FIG. 6B) when reference speed is suddenly reversed from 65 rad/s to −65 rad/s at t=3:3 s. For this case, ROPIO produces disturbance estimate errors which are 5 times larger than M-ROPIO estimate errors. Hence due to absence of reference speed jumps in inherent ROPIO design, its performance is inferior to M-ROPIO in terms of load disturbance estimation error.

Figure 7:
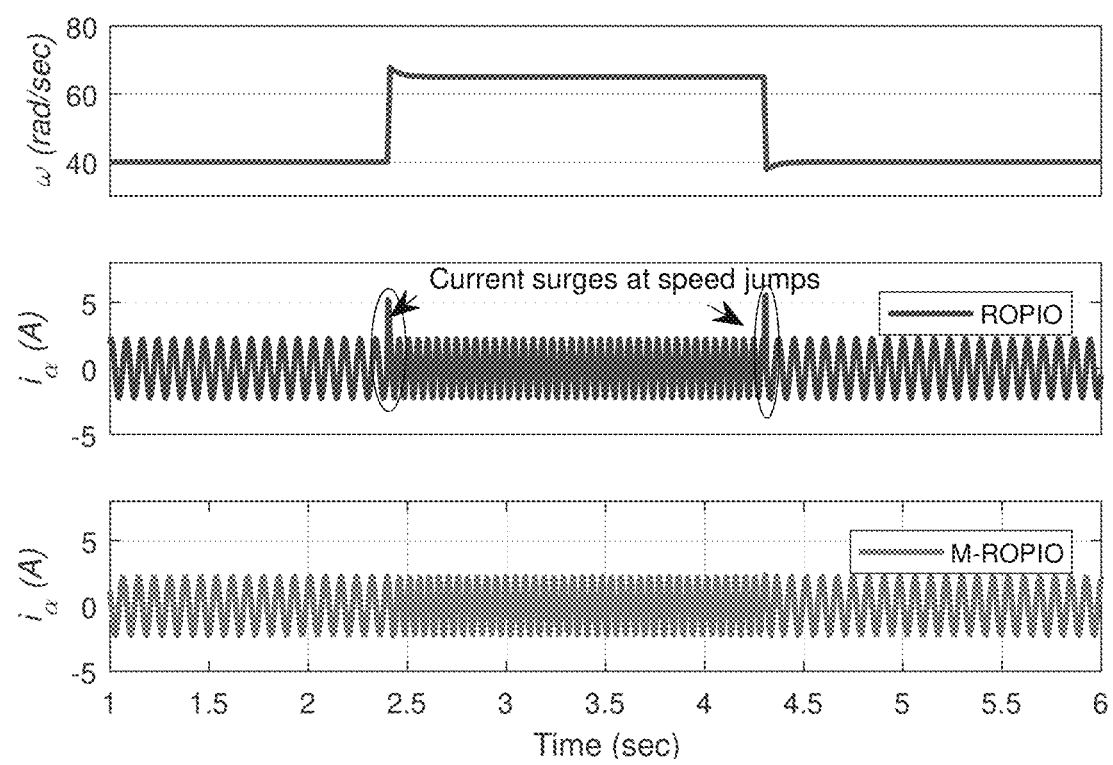
FIG. 7 is effect of speed jumps on stator current (phase a) for two observers used with MPFC.

The effect of wrong disturbance estimates on stator currents is shown in FIG. 7 where phase a current $i_a$ waveform are shown for reference speed jump conditions. In this case, ROPIO produces current surges at the jump instants t=2:4 s and t=4:3 s. These current surges reach up to double of the steady state values of the current whereas M-ROPIO maintains the steady state value of current irrespective of the speed jumps.

Example 2. Experimental Results

Figure 8:
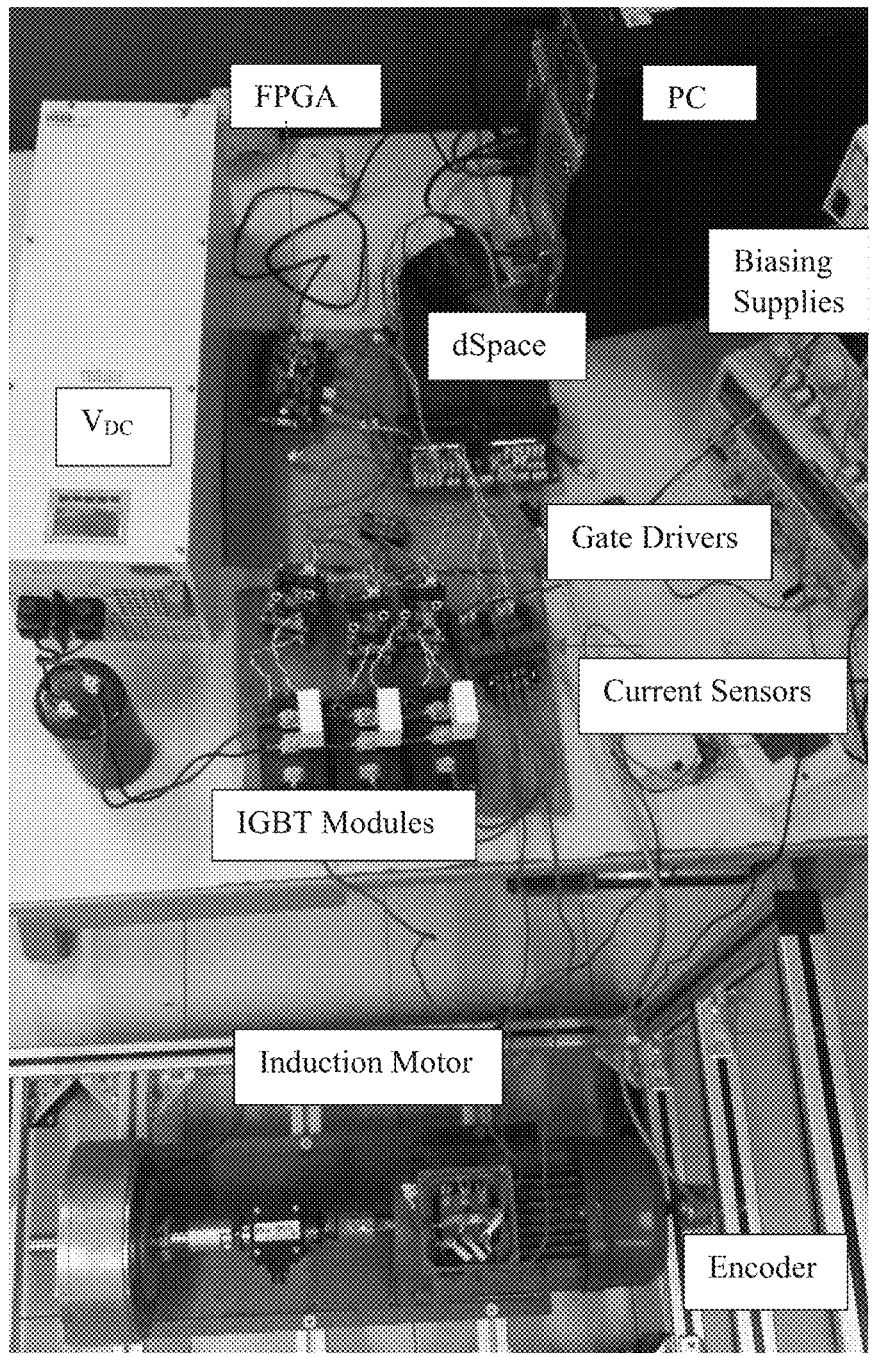
FIG. 8 is an actual hardware setup for real-time implementation of an exemplary embodiment.

To investigate the effectiveness of proposed method, a 2L-VSI fed induction motor drive was used. The experimental setup, shown in FIG. 8, consists of 3 phase induction motor with hysteresis braking system, IGBT based inverter with a DC source and dSpace DS1104 controller board. The proposed control algorithm is implemented in dSpace using C coding. The optimal voltage vector selected by the algorithm is passed through an FPGA board which generates blanking time for the pulses to be applied to IGBTs through gate driver circuits. An incremental speed encoder with a resolution of 1024 pulses per revolution (PPR) and current sensors were also part of the setup to provide speed and current measurements respectively. The motor and controller parameters are given in Table 1. Note that the same parameters were used in obtaining simulation results as well (Example 1).

TABLE 1

Motor parameters

| Parameter | Value |
|---|---|
| Rated Torque, $T_{nom}$ | 10 N.m. |
| Rated Stator Flux, $\Psi_{s\ldots nom}$ | 0.75 Wb |
| Base Speed, $\omega_{base}$ | 65 rad/sec |
| Inverter DC source, $V_{dc}$ | 240 V |
| Total number of pole pairs, p | 2 |
| Sampling Time, $T_s$ | 40 µs |
| Stator Resistance, $R_s$ | 3 Ω |
| Rotor Resistance, $R_r$ | 4.1 Ω |
| Rotor Inductance, $L_r$ | 351 mH |
| Mutual Inductance, $L_m$ | 324 mH |
| Total Inertia, J | 0.0031 kg · m² |
| Total viscous friction, B | 0.0019 kg · m²/s |

During the practical implementation of the MPFC on dSpace DS1104, it was observed that average time to calculate inverse tangent function was around 2.73 µs. In original reference transformation, there are two positions to be determined for rotor flux vector and stator flux vector which requires an average time of 5.46 µs. With modified reference transformation, there is only one inverse tangent function involved whereas with the use of Lagrange approximations the average computational time is reduced to 0.66 µs. Hence M-RT significantly reduces the computational time while keeping all the advantages of reference transformation. This reduction in computational time can be employed to use lower sampling times ($T_s$) for the controllers.

Figure 9:
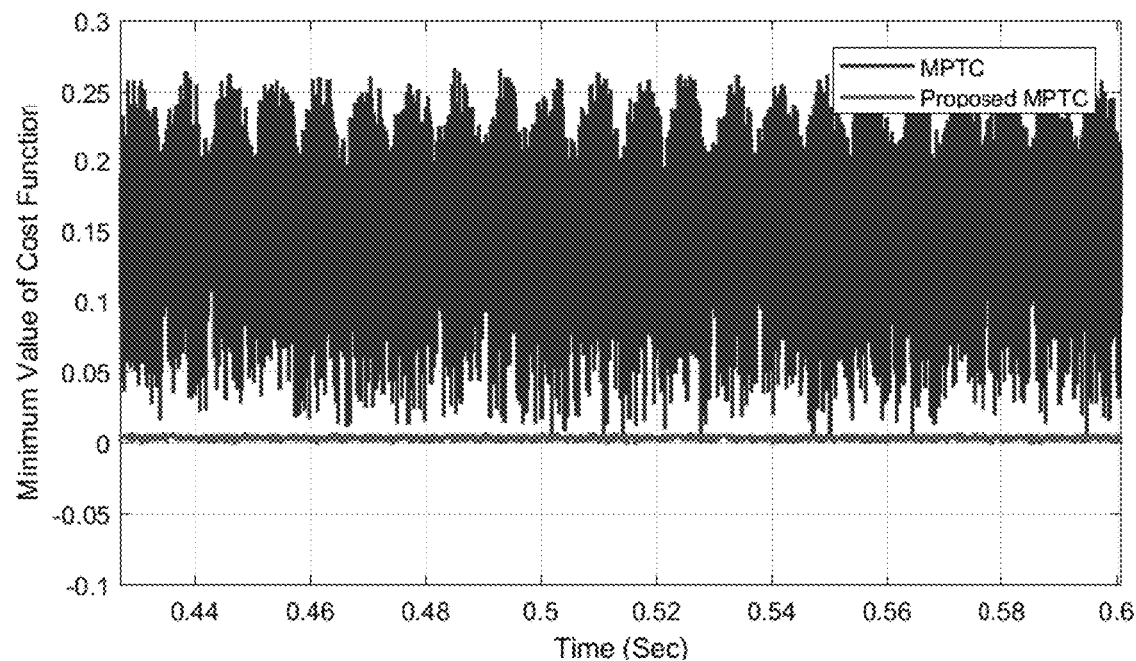
FIG. 9 is the values of the minimum costs obtained for MPTC and MPFC under steady state operation.

To emphasize the weighting-factor-less advantage achieved in MPFC through modified reference transformation, the value of minimum costs of the objective functions of MPTC and MPFC under steady state operation are compared in FIG. 9. The minimum cost function for MPTC has larger values between 0 and 0.27 due to the fact that it consists of two differing errors i.e. torque and flux errors combined through a weighting factor. Wide variations in minimum cost can be reduced by adjusting weighting factor which will set a better balance between the two errors. Whereas, MPFC minimum cost function is almost zero (its actual value remains close to 0.005) due to the fact that it consists of only single error which achieves a better minimization.

Figure 10:
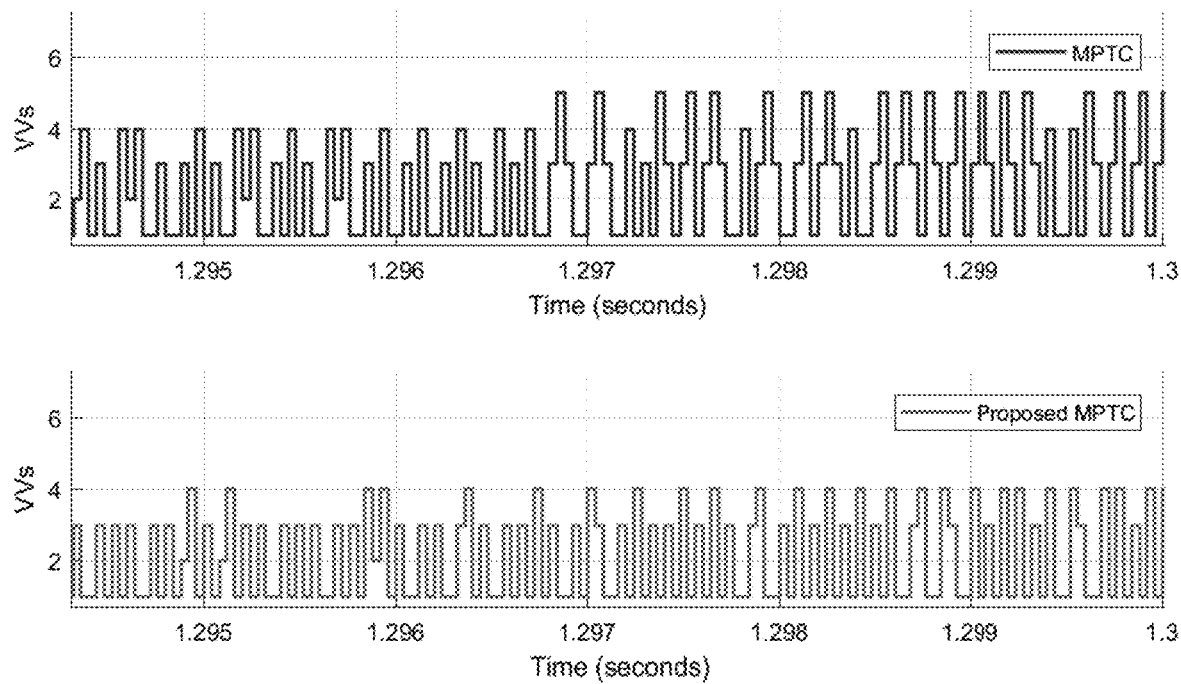
FIG. 10 is optimal VV for MPTC and MPFC under steady state conditions.

Similarly, the selection of the optimal VV at each sampling instant can also be compared for the two inner loop methods. Under steady state conditions, the optimal VV is plotted in FIG. 10 for MPTC and MPFC. For the very short interval of time shown in the figure, MPTC optimal vector could be from $V_1$, $V_2$, $V_3$, $V_4$, and $V_5$ and there are sudden jumps from one VV to another which might not be the closest one. The pattern contributes to the higher switching frequencies. This pattern however is reduced in MPFC and switching states are from one VV to the neighboring VV which will not increase switching frequencies significantly. Moreover, number of total optimal VV selected for MPFC is less than MPTC. Keeping in mind the benefits of MPFC, the rest of the experimental results are obtained only for MPFC whereas similar results can be obtained for MPTC but with a larger flux and torque ripples.

Figure 11A:
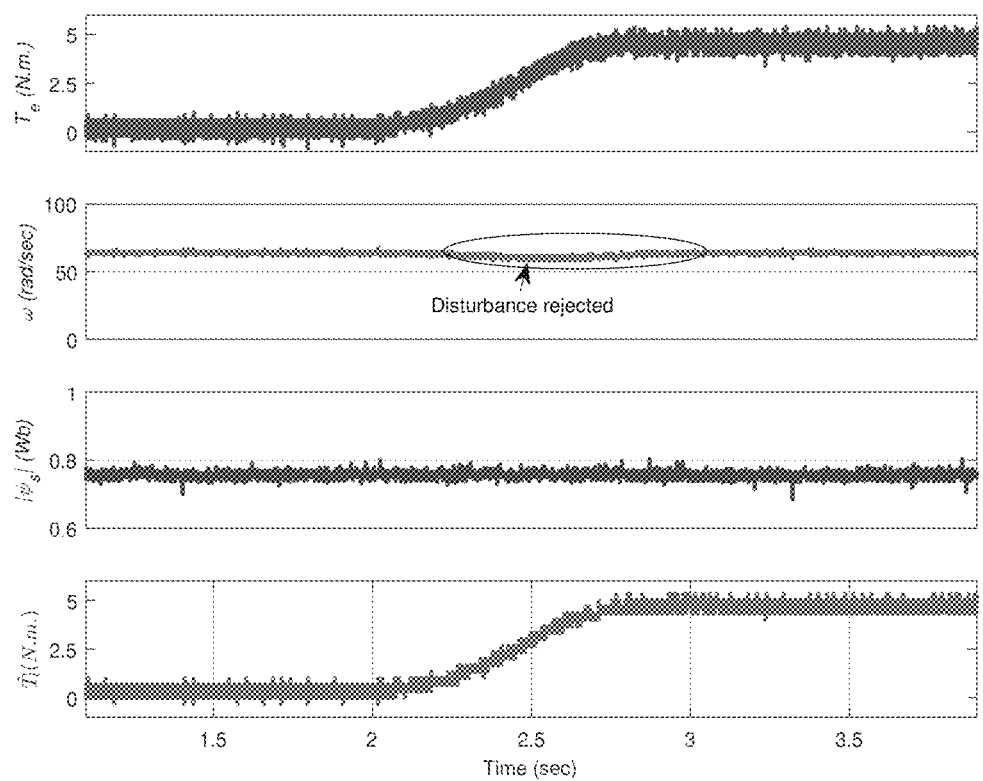
FIG. 11A is experimental results for disturbance rejection capability of two observers used with MPFC for a step change in load torque, ROPIO.
Figure 11B:
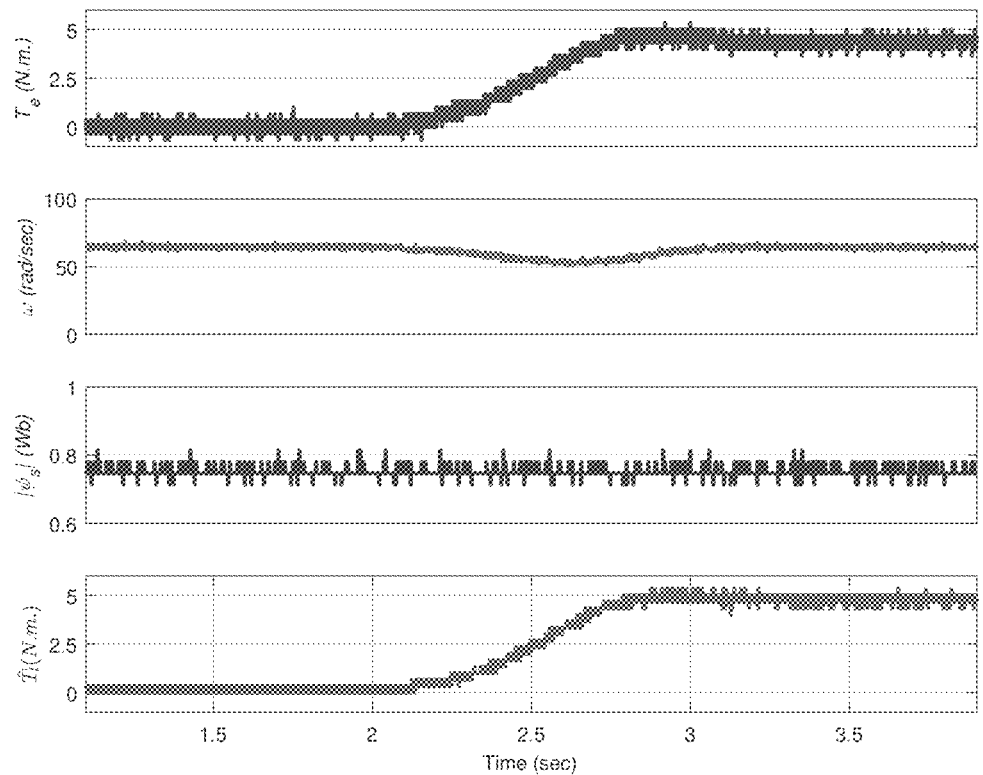
FIG. 11B is experimental results for disturbance rejection capability of two observers used with MPFC for a step change in load torque, M-ROPIO.

FIGS. 11A and 11B demonstrate the disturbance rejection capability of both ROPIO and M-ROPIO when they are combined with MPFC. Similar to the simulation results presented in FIGS. 4A and 4B, a step change of 9.4 N.m. in load torque is applied at t=2:2 s to the motor when it is running at a constant reference speed of 65 rad/s. Waveform of estimated torque, speed, stator flux magnitude and estimated load torque are shown in the figure for both observers. It is clear from the speed response in FIG. 11A that the load observer ROPIO not only correctly estimates the load torque but also rejects its effect on the speed regulation and removes steady state error quickly. At the disturbance load application, a reduction of 5 rad/s in rotor speed is observed but it is overcome within 0.4 s and the speed is maintained at the given reference. Similarly, FIG. 11B represents the steady state performance recovery response of the newly proposed M-ROPIO for the same test. As seen from rotor speed waveform for M-ROPIO, the disturbance rejection capability of the modified observer is similar to ROPIO. The disturbance is rejected within 0.4 s while maximum speed error is around 4 rad/s. However, a comparison of torque and flux response of the two observers shows M-ROPIO has comparatively better flux response than MPFC with ROPIO. Similarly torque ripple in ROPIO is around 1 N.m. while in M-ROPIO, it is equal to 0.8 N.m. (20% less).

Figure 12A:
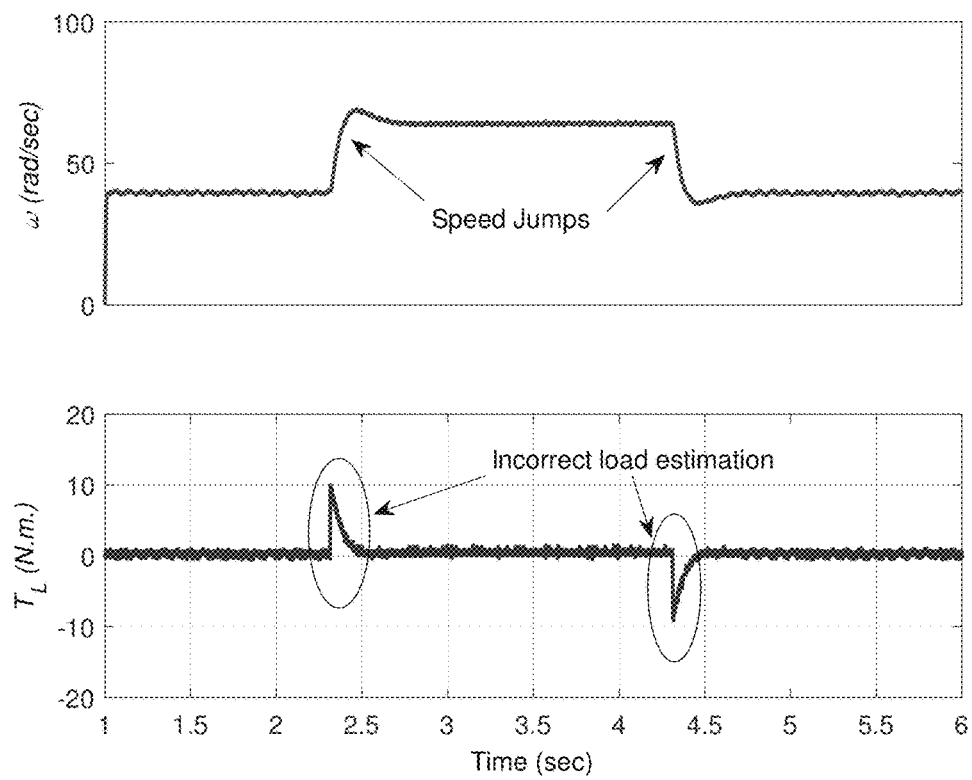
FIG. 12A is transient response of two observers used with MPFC under speed jumps, ROPIO.
Figure 12B:
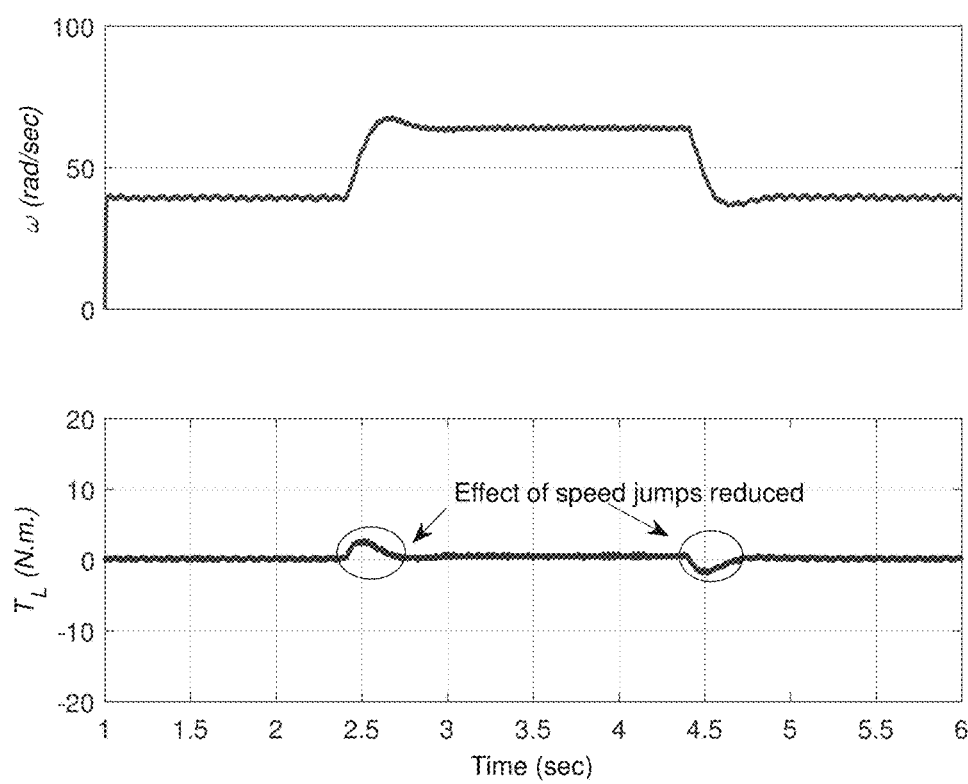
FIG. 12B is transient response of two observers used with MPFC under speed jumps, M-ROPIO.
Figure 13A:
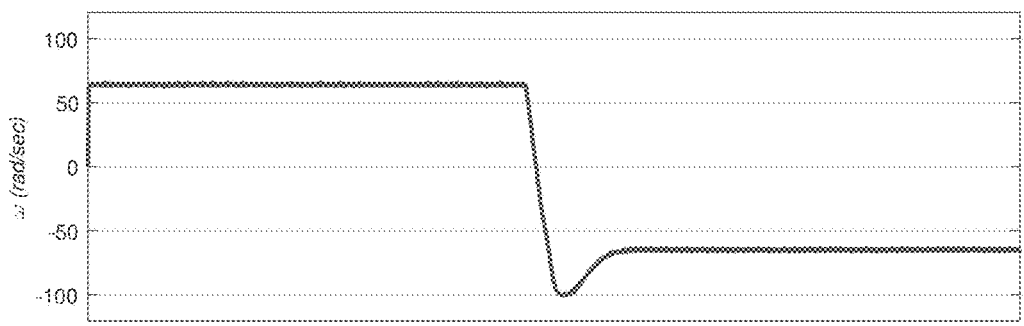
FIG. 13A is transient response of two observers used with MPFC under speed reversal condition, ROPIO.
Figure 13A:
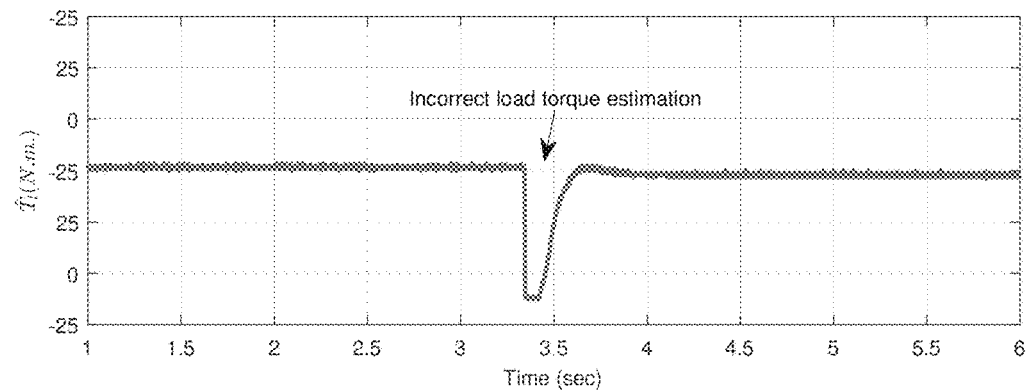
Figure 13B:
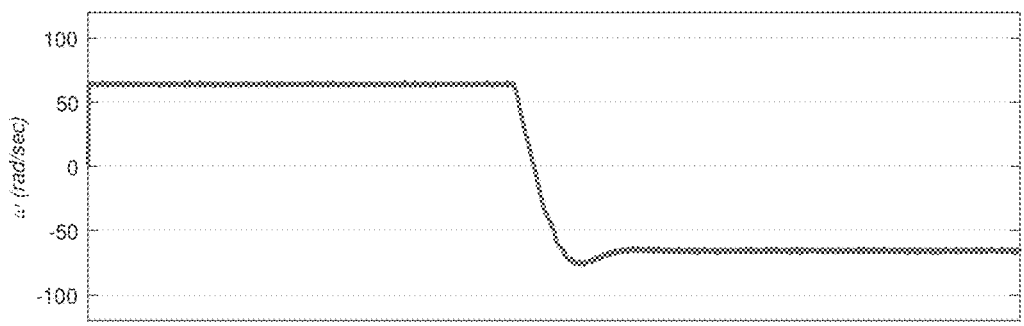
FIG. 13B is transient response of two observers used with MPFC under speed reversal condition, M-ROPIO.
Figure 13B:
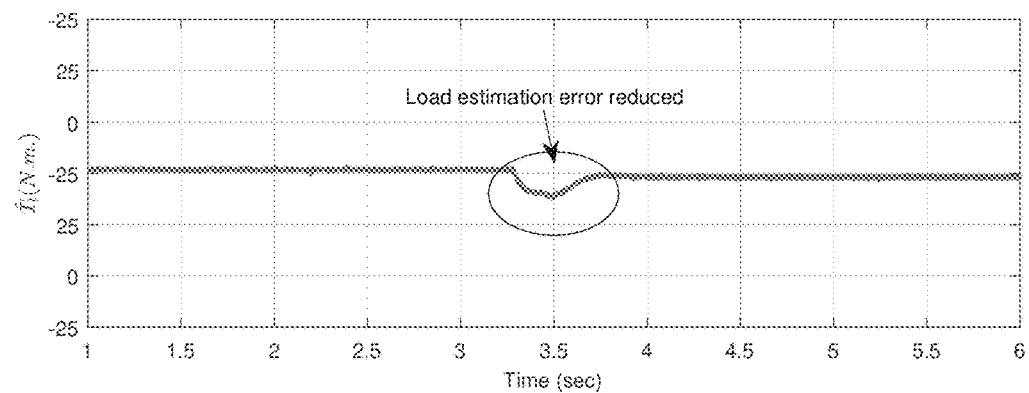

Although ROPIO works relatively satisfactory during steady state condition and demonstrates effective error rejection, its transient response at reference speed jumps and reversal conditions gives incorrect estimation of the load. FIGS. 12A, 12B and 13A, 13B represent experimental validation of simulation results obtained in FIGS. 5 and 6 and show the rotor speed and estimated load torque for ROPIO and M-ROPIO under two different reference speed conditions. In FIGS. 12A and 12B, step changes in reference speed are applied to the unloaded motor and actual rotor speed and estimated load torque waveform are given for ROPIO and M-ROPIO. As shown in these waveforms, reference speed changes from 40 rad/s to 65 rad/s at 2.4 s and back to 40 rad/s at 4.3 s. During these speed jumps, ROPIO scheme loses its performance momentarily and recovers from the loss within 0.1 s as shown in estimated load torque waveform. It happens because the reference speed jumps are ignored in the design. The error in load torque estimation for ROPIO is even greater when the jumps in reference speed are larger as might be the case in speed reversal tests. The waveform of speed and estimated load torque for speed reversal test for ROPIO are shown in FIG. 13A. At time 3.3 s, reference speed is changed from 65 rad=s to −65 rad=s and the estimated torque by the load observer is recorded. As can be seen from the figure, estimation of load torque is incorrect at speed jump. The load observer gives 0.4 N.m. error for a speed jump of 1 rad/s. The superiority of the modified observer M-ROPIO is clearer during transient response. The speed jump test and speed reversal test responses of M-ROPIO are shown in FIG. 12B and FIG. 13B. It is visible from the waveform that observer response has improved significantly. A comparison of ROPIO and M-ROPIO responses reveals that error in load estimation has decreased close to 80% in M-ROPIO.

Figure 14:
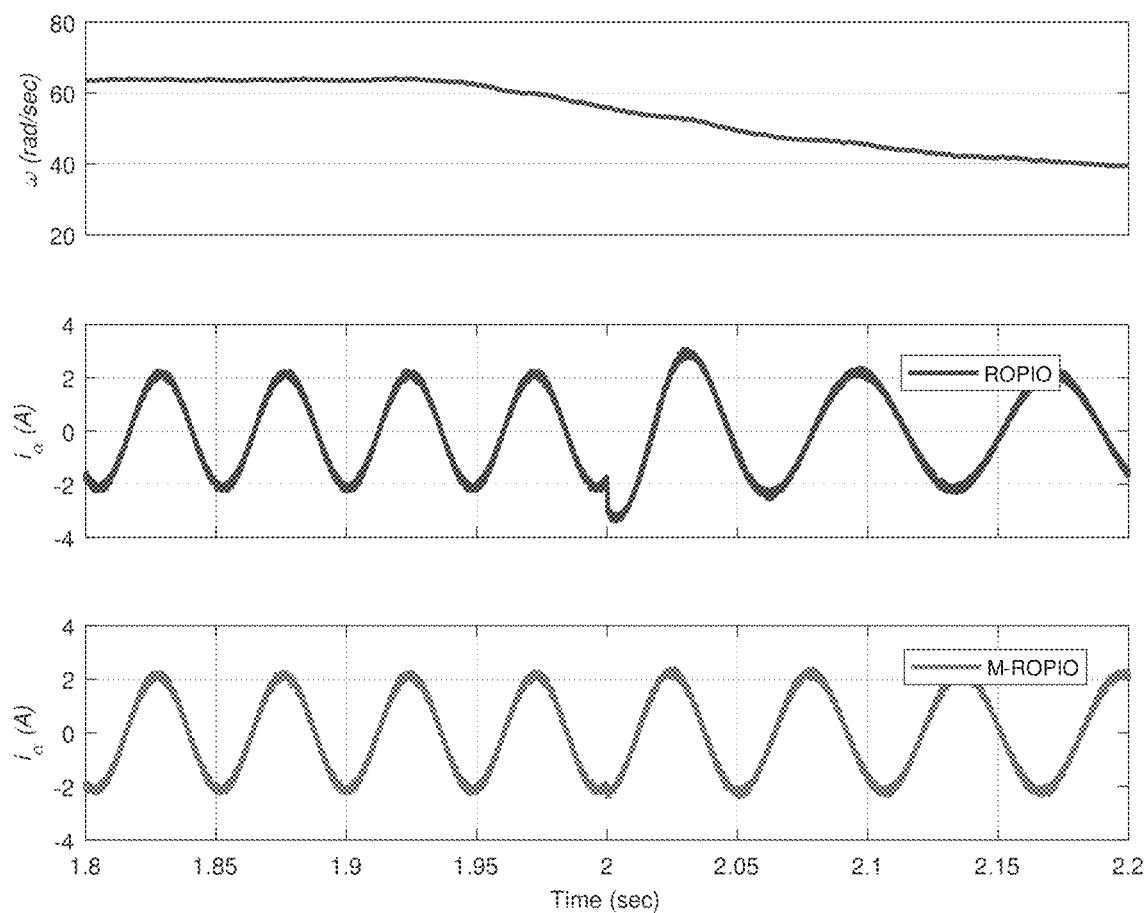
FIG. 14 is comparison of stator currents (phase a) at speed jumps for ROPIO and M-ROPIO.

The phase a current waveform $i_\alpha$ comparison for both observers at sudden speed jumps is presented in FIG. 14. Stator current with proposed scheme M-ROPIO remains effectively smooth during short speed jump from 65 rad/s to 40 rad/s at t=2 s, whereas, the same speed jump produces higher current for ROPIO and $i_\alpha$ deviates from the steady state value of maximum 1.8 A up to 3.3 A momentarily and quickly settles down to steady state value. However, this kind of short interval surges in current may be dangerous for safe motor operation.

Figure 15A:
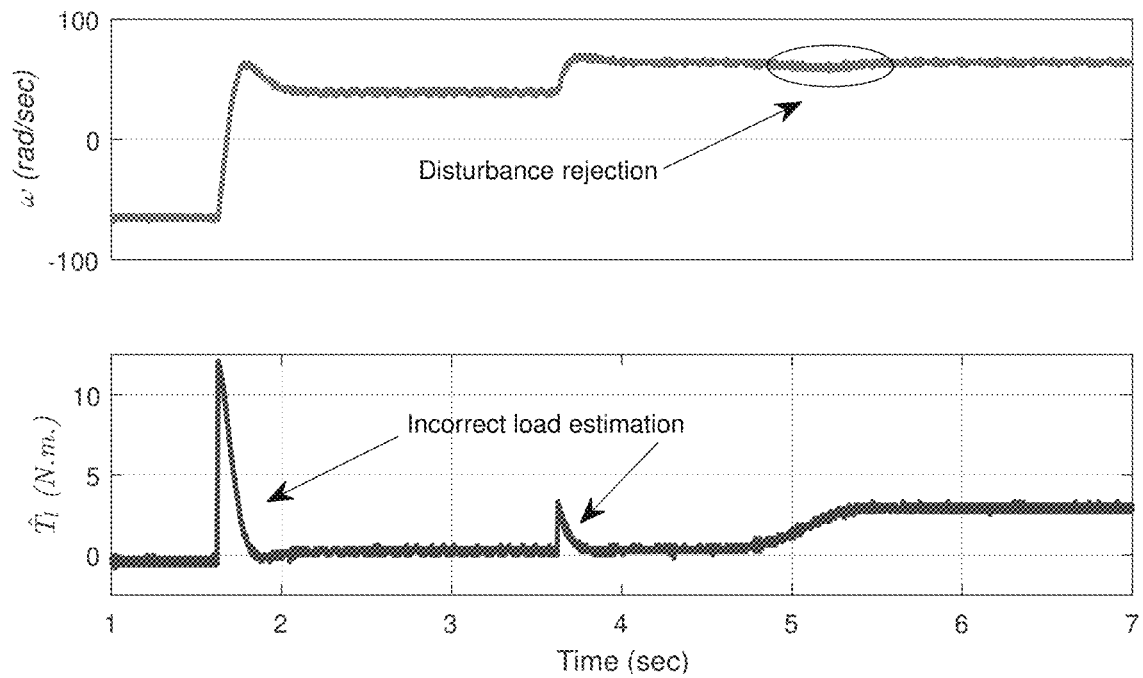
FIG. 15A is transient response of two observers under speed jumps and load torque disturbance, ROPIO.
Figure 15B:
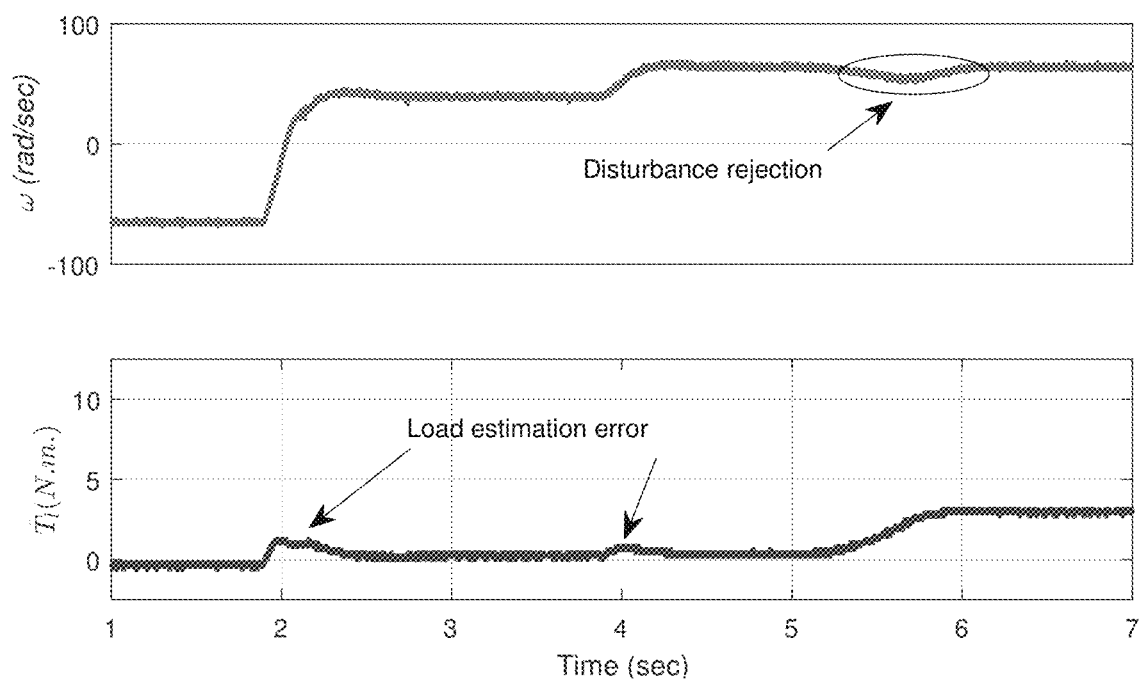
FIG. 15B is transient response of two observers under speed jumps and load torque disturbance, M-ROPIO.

To see the overall performance of both observers, an experiment combining reference speed reversal, speed jumps and a load was conducted. The motor starts unloaded at a reference speed of −65 rad/s. The reference speed is reversed to 40 rad=s around 1.8 s and increased to 65 rad=s around 3.8 s. A load of 5.2 N.m. is applied around 5.5 s. The estimated load torque along with rotor speed are shown in FIGS. 15A and 15B for both observers ROPIO and M-ROPIO. It can be seen from the figure that modified observer gives better load torque estimation with significantly reduced error.

ACKNOWLEDGEMENT

This project was funded by King Abdulaziz University, Jeddah, Saudi Arabia and King Abdullah City for Atomic and Renewable Energy, Riyadh, Saudi Arabia under grant no. KCR-KFL-05-20.

As will be apparent to those of skill in the art upon reading this disclosure, each of the individual embodiments described and illustrated herein has discrete components and features which may in the practice of the invention be separated from or combined with the features of any of the other several embodiments without departing from the scope or spirit of the present invention. Any recited method can be carried out in the order of events recited or in any other order which is logically possible.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

While exemplary embodiments of the present invention have been disclosed herein, one skilled in the art will recognize that various changes and modifications may be made without departing from the scope of the invention as defined by the following claims.

What is claimed is:

1. A cascaded finite control set model based predictive flux control system for an induction motor, comprising
   an outer speed control loop comprising a disturbance observer based controller (DOBC) with a modified reduced order proportional integral observer (M-ROPIO) configured to minimize load torque estimation error with a low-pass filter (LPF) with a cutoff frequency, wherein the outer speed control loop is configured to generate a reference torque T*, wherein the reference torque T* is limited by a rated torque of the induction motor, wherein the M-ROPIO maintains a substantially steady state value of current irrespective of speed jumps, an inner torque control loop comprising a weighting-factor-free formulation of model based predictive torque control (MPTC) using modified reference transformation to determine reference flux angle from the reference torque T* generated by the outer speed control loop, wherein the control system outputs a switching state for the induction motor selected using the reference flux angle.

2. The control system of claim 1, wherein the modified reference transformation uses arctan function.

3. The control system of claim 1, wherein the modified reference transformation gives the reference flux angle $\theta^*_s$ as $$\theta^*_s = \arctan\left(\frac{u+v}{1-uv}\right)$$

where $$u = \frac{\psi_{r\beta}}{\psi_{r\alpha}},$$

$$v = \frac{T^*}{\sqrt{\left(\frac{3}{2}p\eta L_m|\psi_r||\psi^*_s|\right)^2 - (T^*)^2}},$$

$$\eta = \frac{1}{L_s L_r - L_m^2},$$

$\psi_r$ is rotor flux vector, and
$\psi^*_s$ is reference stator flux vector.

4. A method of controlling an inductive motor that has an inverter and motor terminals, the method comprising
determining a switching state of the inverter with a control system,
directly applying the selected switching state to the inverter,
with the inverter, translating the selected switching state to a corresponding voltage vector (VV) and applying the VV to the motor terminals,
wherein the control system comprises
an outer speed control loop comprising a disturbance observer based controller (DOBC) with a modified reduced order proportional integral observer (M-ROPIO) configured to minimize load torque estimation error with a low-pass filter (LPF) with a cutoff frequency, wherein the outer speed control loop is configured to generate a reference torque T*, wherein the reference torque T* is limited by a rated torque of the induction motor, wherein the M-ROPIO maintains a substantially steady state value of current irrespective of speed jumps,
an inner torque control loop comprising a weighting-factor-free formulation of model based predictive torque control (MPTC) using modified reference transformation to determine reference flux angle from the reference torque generated by the outer speed control loop, wherein the switching state is selected using the reference flux angle.

5. A cascaded finite control set model based predictive flux control system for an induction motor, comprising
an outer speed control loop comprising a disturbance observer based controller (DOBC) with a modified reduced order proportional integral observer (M-ROPIO), wherein the outer speed control loop is configured to generate a reference torque T*,
an inner torque control loop comprising a weighting-factor-free formulation of model based predictive torque control (MPTC) using modified reference transformation to determine reference flux angle from the reference torque T* generated by the outer speed control loop,
wherein the control system outputs a voltage or a switching state based on the voltage for the induction motor selected using the reference flux angle.

6. The control system of claim 5, wherein the M-ROPIO is configured to minimize load torque estimation error with a low-pass filter (LPF) with a cutoff frequency.

7. The control system of claim 5, wherein the reference torque T* is limited by a rated torque of the induction motor.

8. The control system of claim 5, wherein the M-ROPIO maintains a substantially steady state value of current irrespective of speed jumps.

\* \* \* \* \*